(12) United States Patent
Lingle et al.

(10) Patent No.: US 11,190,918 B1
(45) Date of Patent: Nov. 30, 2021

(54) SYSTEMS AND METHODS FOR SENSING, RECORDING, ANALYZING AND REPORTING ENVIRONMENTAL CONDITIONS IN DATA CENTERS AND SIMILAR FACILITIES

(71) Applicant: Eta Vision Inc., Chicago, IL (US)

(72) Inventors: Michael T. Lingle, Chicago, IL (US); Michael Conaboy, Westminster, CO (US)

(73) Assignee: Eta Vision Inc., Chicago, IL (US)

( * ) Notice: Subject to any disclaimer, the term of this patent is extended or adjusted under 35 U.S.C. 154(b) by 0 days.

(21) Appl. No.: 16/390,879

(22) Filed: Apr. 22, 2019

Related U.S. Application Data

(63) Continuation of application No. 15/369,537, filed on Dec. 5, 2016, now Pat. No. 10,516,981.
(Continued)

(51) Int. Cl.
*H04W 4/70* (2018.01)
*H04L 29/08* (2006.01)
(Continued)

(52) U.S. Cl.
CPC ............ *H04W 4/70* (2018.02); *G06F 1/3203* (2013.01); *H02J 50/00* (2016.02); *H02J 50/001* (2020.01); *H04L 12/66* (2013.01); *H04L 43/06* (2013.01); *H04L 67/10* (2013.01); *H04W 40/02* (2013.01); *H04W 52/02* (2013.01); *H04W 52/0209* (2013.01); *H04W 84/18* (2013.01); *G06F 1/3228* (2013.01); *G11B 33/02* (2013.01); *H04W 28/06* (2013.01); *H04W 28/08* (2013.01); *H04W 52/0219* (2013.01); *Y02D 30/70* (2020.08)

(58) Field of Classification Search
CPC ......... G11B 33/02; H04L 12/66; H04L 43/06; H04L 67/10; H04W 4/70; H04W 52/0219; H04W 28/06; H04W 28/08; H04W 40/02; H04W 52/02; H04W 84/18; H04W 52/0209; Y02D 70/22; Y02D 70/142; Y02D 70/30; Y02D 30/70; G06F 1/3228; G06F 1/3203; H02J 50/001; H02J 5/005; H02J 7/025; H02J 50/00
See application file for complete search history.

(56) References Cited

U.S. PATENT DOCUMENTS 6,977,587 B2  12/2005  Pradhan et al.
7,114,555 B2 * 10/2006  Patel .................... G05D 1/024
                                                        165/247
(Continued)

OTHER PUBLICATIONS

EDN.com. "Applying the interrupt features of MEMS accelerometers", Jul. 26, 2012, 3 pages. (Year: 2012).*
(Continued)

*Primary Examiner* — George C Neurauter, Jr.
(74) *Attorney, Agent, or Firm* — McAndrews, Held & Malloy, Ltd.

(57) ABSTRACT

The present disclosure pertains to utilizing hardware and software to control and record environmental and other data obtained from sensors and other devices, placed throughout a facility, and analyzing and displaying the information in a detailed status report of the environmental conditions inside facility, and once analyzed, the software can provide recommendations to implement measures that increase the efficiency of the facility.

17 Claims, 13 Drawing Sheets

Related U.S. Application Data

(60) Provisional application No. 62/262,715, filed on Dec. 3, 2015.

(51) Int. Cl.

| | | |
|---|---|---|
| *H04L 12/26* | (2006.01) | |
| *H02J 50/00* | (2016.01) | |
| *H04W 84/18* | (2009.01) | |
| *H04W 52/02* | (2009.01) | |
| *H04W 40/02* | (2009.01) | |
| *G06F 1/3203* | (2019.01) | |
| *H04L 12/66* | (2006.01) | |
| *G11B 33/02* | (2006.01) | |
| *G06F 1/3228* | (2019.01) | |
| *H04W 28/08* | (2009.01) | |
| *H04W 28/06* | (2009.01) | |

(56) References Cited

U.S. PATENT DOCUMENTS

| | | | | |
|---|---|---|---|---|
| 7,676,280 | B1* | 3/2010 | Bash | H05K 7/20836 700/17 |
| 8,160,838 | B2* | 4/2012 | Ramin | F24F 13/0209 455/66.1 |
| 8,171,142 | B2* | 5/2012 | Kolin | H05K 7/20836 382/104 |
| 8,694,279 | B1* | 4/2014 | Stiver | H05K 7/20836 165/104.33 |
| 8,811,377 | B1* | 8/2014 | Weston | H04W 52/0219 370/351 |
| 8,943,352 | B1 | 1/2015 | Warneke | |
| 8,983,675 | B2* | 3/2015 | Dawson | F24F 11/0001 700/300 |
| 9,055,697 | B2* | 6/2015 | Lyon | H05K 7/20836 |
| 9,310,784 | B1* | 4/2016 | Roy | G05B 13/02 |
| 9,591,606 | B1* | 3/2017 | Shetty | G01S 5/0284 |
| 9,865,016 | B2* | 1/2018 | Joshi | G06Q 30/0269 |
| 9,972,761 | B2* | 5/2018 | Alhawari | H01L 35/28 |
| 10,007,850 | B2* | 6/2018 | Leung | G06T 7/292 |
| 10,228,668 | B2* | 3/2019 | Zhou | H05K 7/20836 |
| 10,368,148 | B2* | 7/2019 | Kumar | G06F 3/0679 |
| 10,432,473 | B2* | 10/2019 | Cencini | H05K 7/20836 |
| 10,530,597 | B1* | 1/2020 | King | H02J 13/0017 |
| 2003/0046339 | A1* | 3/2003 | Ip | H04L 41/12 709/203 |
| 2006/0214014 | A1* | 9/2006 | Bash | G05D 23/1931 236/1 B |
| 2007/0062685 | A1* | 3/2007 | Patel | G05D 1/024 165/247 |
| 2008/0269932 | A1* | 10/2008 | Chardon | G06T 11/206 700/98 |
| 2009/0012633 | A1* | 1/2009 | Liu | G06F 1/206 700/90 |
| 2009/0199580 | A1* | 8/2009 | Lyon | G05D 23/1932 62/157 |
| 2009/0242265 | A1* | 10/2009 | Doorhy | H01R 25/006 174/494 |
| 2010/0131788 | A1* | 5/2010 | Lo | G06F 1/3228 713/323 |
| 2010/0157516 | A1* | 6/2010 | Doorhy | H04L 41/16 361/679.02 |
| 2011/0258302 | A1* | 10/2011 | Cole | G06F 11/006 709/223 |
| 2012/0039319 | A1* | 2/2012 | Moore | H04L 43/0817 370/338 |
| 2012/0039612 | A1* | 2/2012 | Piazza | H04B 10/80 398/118 |
| 2012/0109404 | A1* | 5/2012 | Pandey | H04L 67/12 700/299 |
| 2012/0303164 | A1* | 11/2012 | Smith | H05K 7/20745 700/276 |
| 2012/0313612 | A1* | 12/2012 | Schneider | G05F 1/67 323/311 |
| 2013/0166241 | A1* | 6/2013 | Hamann | H05K 7/20836 702/99 |
| 2013/0176675 | A1* | 7/2013 | Hundertmark | F24F 12/006 361/679.31 |
| 2013/0187636 | A1* | 7/2013 | Kast | H01R 4/28 324/127 |
| 2016/0248697 | A1* | 8/2016 | Masuyama | H04L 47/783 |
| 2016/0282823 | A1* | 9/2016 | Wang | G06Q 50/06 |
| 2017/0201099 | A1* | 7/2017 | Savanth | H02J 50/40 |
| 2018/0017660 | A1* | 1/2018 | Roquel | G01S 5/0252 |
| 2018/0225230 | A1* | 8/2018 | Litichever | G06F 21/56 |

OTHER PUBLICATIONS

Danilo Porcarelli et al. "Clamp-and-Forget: A self-sustainable non-invasive wireless sensor node for smart metering applications", MicroElectronics Journal, 2014, 8 pages. (Year: 2014).*

Yu Zhou et al. "Harvesting Wasted Heat in a Microprocessor Using Thermoelectric Generators: Modeling, Analysis and Measurement", 2008 IEEE Design, Automation and Test in Europe, 6 pages. (Year: 2008).*

Maurizio Rossi et al. "Energy Neutral Wireless Sensing for Server Farms Monitoring", IEEE Journal on Emergiing and Selected Topics in Circuits and Systems, vol. 4, No. 3, Sep. 2014, 11 pages. (Year: 2014).*

* cited by examiner

SYSTEMS AND METHODS FOR SENSING, RECORDING, ANALYZING AND REPORTING ENVIRONMENTAL CONDITIONS IN DATA CENTERS AND SIMILAR FACILITIES

CROSS-REFERENCE TO RELATED APPLICATION

This application is a continuation of U.S. patent application Ser. No. 15/369,537, filed on Dec. 5, 2016, entitled "SYSTEMS AND METHODS FOR SENSING, RECORDING, ANALYZING AND REPORTING ENVIRONMENTAL CONDITIONS IN DATA CENTERS AND SIMILAR FACILITIES", which is hereby incorporated by reference in its entirety herein. This application claims priority to U.S. provisional application No. 62/262,715, filed Dec. 3, 2015, entitled SYSTEMS AND METHODS FOR SENSING, RECORDING, ANALYZING AND REPORTING ENVIRONMENTAL CONDITIONS IN DATA CENTERS AND SIMILAR FACILITIES, which is hereby incorporated by reference in its entirety as though fully set forth herein.

FIELD OF THE INVENTION

The present disclosure pertains to sensing, measuring, recording and reporting environmental parameters and conditions in facilities such as data centers. In particular, the present disclosure pertains to a system and method of utilizing specialized electronics and software to control and record environmental and other data obtained from sensors and other devices, placed throughout a facility, and analyzing and displaying the information in a detailed status report (or other reporting functionalities) of the environmental conditions, power consumption, and other business or technical metrics inside facility.

The sensed and measured environmental parameters and conditions include temperatures, air pressures, air flows, various humidity, power consumption, indoor location (detected by onboard electronics, GPS, beacons, time of flight/time of arrival, etc.), motion detection, occupancy detection, light sensing, and vibration among others, at various locations and heights throughout the facilities. The software provides a detailed view into the power density, cooling requirements, and cooling supply of the data center, including, but not limited to, Computational Fluid Dynamics (CFD) analysis indicating air flow and temperature gradients throughout the facility. The software can also provide standard and custom visualizations that can be used to view and understand the low level data, high level analytics to provide analysis and an understanding of the performance of the facility. Further, the software can allow for hypothetical analysis to test theoretical scenarios and circumstances. All of the actual measured values and calculated analytics determined by the system can be mapped to the geographic location of the sensors.

By utilizing the rich data collected by the system, unique methods for analysis become possible. Examples include "what if" analysis used to test potential configuration scenarios or real-time CFD (Computational Fluid Dynamics) used to visualize how air is moving throughout the facility.

Once analyzed, the software can provide recommendations to implement measures that increase the efficiency of the facility. The software also incorporates standard operating procedures, best practices, audit and compliance logs, and fault detection.

The system and methods disclosed herein assist in controlling the supporting infrastructure at the facility such as HVAC (Heating, Ventilation and Air Conditioning) equipment, lighting, IT systems, and security systems among others by utilizing the rich data collected by the system.

The system and methods disclosed herein assist in ensuring that facilities and infrastructure, such as data centers, adapt to the most optimal and efficient operation as IT (Information Technology) loads in those facilities evolve.

BACKGROUND OF THE INVENTION

According to Eric Schmidt, Co-Founder of Google, every two days we create as much information as we did from the dawn of civilization up until 2003. The need for data, storage, and processing resources has driven large technological advancements in how computing is delivered. These have predominantly focused around virtualization, high density computing, storage consolidation, and centralization.

A facility such as a data center is used to store computer systems and associated components, such as telecommunications and storage systems. The facility generally includes a number of different types of devices for operational purposes and also for protection reasons. Such devices include, but are not limited to, redundant or backup power supplies, redundant data communications connections, environmental controls (air conditioning, fire suppression devices, etc.) and also various security devices. Data centers can be large enough to need to be housed in large buildings, and can use an enormous amount of electricity to run properly.

To keep pace with the increasing demand, data center infrastructure has historically been oversized at design. To allow a rapid increase in capacity vendors have started to develop more modular infrastructure products. These include modular centralized UPS systems, power distribution units, cooling units, and room construction (raised floors and drop ceilings). As such, IT loads would increase with little change to the infrastructure until the infrastructure could no longer support the load or redundancy requirements. At that time, consultants or in-house teams would be tasked to redesign the data center infrastructure by utilizing these modular components, and size it for future IT growth, starting the cycle all over again.

Up until recently these infrastructure components acted predominantly independently from one another and were always responding in a reactive nature to the IT load. This has spawned the recent advent of data center infrastructure management (DCIM) hardware and software, and environmental monitoring hardware and software.

According to the DOE, operators of the vast majority of data centers across the U.S. do not currently practice "energy management" to improve their efficiency and reduce energy costs. Kathleen Hogan, DOE's deputy assistant secretary for energy efficiency, told Mashable in an interview that "half of the energy used to power a data center is used for the cooling and powering of equipment, with the other half going to actually running the servers and other IT equipment."

The trend in increasing IT loads and smarter infrastructure products has sparked the idea that data center infrastructure needs to grow along side with IT, not just react to it. Companies and organizations like Google, Apple, and NREL have started to pave the way to prove that keeping data center infrastructure in sync with the IT equipment not only reduces operational costs, but also increases stability and reliability.

Case studies from these companies & organizations, government regulations, subsidies, and increasing energy costs have opened up the market for solutions that optimize data center infrastructure and reduce operational costs. According to DOE statistics, data center electricity use doubled between 2001 to 2006, from 30 to 60 billion kilowatt-hours of electricity, and stood at about 100 billion kilowatt-hours of electricity as of 2013. This amounts to about 2% of all U.S. electricity use and is increasing. Already, there are millions of data centers in the U.S., amounting to about one center per 100 individuals, and this is expected to continue to grow as more computing applications for large and small companies are moved to these facilities.

With an increase in the need for additional storage, such as for cloud computing and other storage needs, individuals, businesses and governmental organizations, have increased their needs for data centers and in doing so, has put pressure on the data centers to grow, and yet maintain the same security, availability, environmental impact and adherence to standards as previously provided. As such Data centers typically cost a lot to build, grow and to maintain.

Also, as technology improves and customer demands increase, the IT technology in facilities such as data centers changes rapidly. In particular, IT equipment, configurations, power densities, etc. change rapidly inside those data center, and at the same time, critical infrastructure components like cooling systems, air flow distribution, humidity controls, etc. remain relatively static, even while the IT equipment changes. The infrastructure lag results in inefficient operation of the critical environmental controls that support the IT equipment. This leads to increases in Power Usage Effectiveness (PUE) and drives up overall operating costs. In some cases, IT changes can be so significant that the environmental conditions push elements of the IT equipment into fault tolerances and can put quality of service at risk.

When a typical new Tier Ill data center is commissioned, a team of competent engineers, operators, and business people come together to build a facility that is optimized to deliver IT services in the current business climate at the time, with room to grow into their best guess forecast. The IT demands can drastically change based on the launch of a single app, innovation, or the acquisition of a new customer.

For example, if the data center acquires a new customer whose primary use is compute cycles, the processors in the data center could see dramatically higher utilization in a matter of seconds and therefore produce significantly more heat in the physical space that they occupy. Meanwhile, the HVAC systems deliver cold air in the same locations. Eventually as the temperature averages out through the facility, the HVAC equipment will register a slight increase in average temperature and respond by increasing cooling and airflow to all the locations it is already delivering cold air to. In this scenario, the majority of the equipment is being over cooled to compensate for the exception. This scenario is the state of the art in today's data centers and is very inefficient when there are shifts in IT demand, density, or distribution.

There are often thousands of IT devices in a large Tier Ill data center. If there are alarms on the IT equipment itself, the operator has to be able to physically locate the device inside of a large facility to know where the issue is. Compounding the problem is that there are frequent upgrades and changes to the IT equipment inside the data center as businesses and operators strive up with improving technologies. As a result the CAD (Computer Aided Design) drawings used for asset management are constantly out of date.

In today's environment, data center operators are held accountable for meeting certain service levels, and are thus highly focused on the IT equipment's performance. The supporting infrastructure tends to be significantly overdesigned and set to produce at levels significantly higher than is required by the IT equipment. This configuration allows operators to build large wasteful operating margins into the infrastructure equipment, to simplify the problem and focus on optimizing the IT hardware. Over time, incremental IT upgrades increase the loads on the infrastructure until the performance is no longer adequate to safely support the operation of the IT equipment. At this stage, consultants or internal teams are called in to solve the problem by redesigning or upgrading the facility. It is not uncommon to see significant infrastructure changes quarterly with the rapid pace of IT changes.

It would be advantageous to provide a system and related methods for utilizing software to control sensors and record environmental and other data obtained from those sensors and other devices that have been strategically placed throughout a facility, in a flexible, low maintenance package with automated geographic mapping. It would also be advantageous if, once the data is sensed, measured and recorded, the system and methods would analyze the information and display the information in a detailed status report, indicating the environmental conditions inside facility along with recommendations to implement measures that increase the efficiency of the particular facility.

SUMMARY OF THE INVENTION

The present disclosure pertains to a system and method of utilizing software to control and record environmental and other data obtained from sensors and other devices, placed throughout a facility such as a data center. The system and methods are configured to analyze the information obtained from the sensors and to display the information in a detailed status report of the environmental conditions inside facility, using graphs, maps, charts, windows, dashboards, histograms, scatter plots, and other types of presentation strategies.

As described herein, the disclosure provides for the sensing and measuring of environmental parameters and conditions, which may include some or all of the following: temperature, air pressure, humidity, and power consumption, and others, at various locations and heights throughout the facility. By using the software associated with the system, the user can receive detailed views into the power density, cooling requirements, and cooling supply of the facility. The software can also be configured to provide standard and custom visualizations to view and understand either the low level data, or the high level analytics. Either way, the user is provided analysis and an understanding of the performance of the facility.

In the preferred embodiment, the system of the present disclosure is a combination of five main components: the sensor network nodes, known location nodes, the gateway/edge nodes, the cloud, and the interface. A mesh network (a wireless personal area network or WPAN) and a wide area network or WAN are deployed to connect all of the five main components.

The present disclosure creates flexibility and improves the performance of major infrastructure assets, such as data centers, that are traditionally static. Data center operators will have access to environmental information that previously had never existed or was not feasible to measure at this level of granularity, all in real time. Operators will also have to ability to reconfigure the sensor fleet with nominal input or configuration required, enabling the data required to keep the infrastructure in sync with the IT immediately available. Ultimately, data center operators are empowered to take action with their infrastructure and drive improvements in redundancy, efficiency, IT equipment performance, lower PUE, and decrease operating costs.

One of the benefits of the present disclosure is that data center operators will be able to review and revise their environmental settings, as described herein, and reduce electricity usage in a way that can offer immediate and ongoing savings. The amount of savings is highly dependent on the size of the data center, the equipment installed, and the infrastructure systems. For example, a typical 800 kw data center could see between $50,000 and $300,000 in power savings annually, which will be even higher as the trend for larger data centers and higher power density continues, thereby increasing these savings.

Another benefit of the present disclosure is the reduced cost in new designs. The design and commission of new data centers often start off with significantly over designed infrastructure, including designs that go beyond necessary redundancy requirements. Over time, data center operators slowly reach the "limits" of the infrastructure as the IT equipment rapidly changes inside and increases in density. Typically, once those limits have been reached, a consultant or an internal team is called in to redesign and often over design the system update, starting the process all over again.

The present disclosure, using appropriate sensors and similar devices allows data center operators to have access to data at the granularity required, which does not currently exist. This information can be used for thorough thermodynamic analysis of the environmental systems, allowing for vastly improved efficiencies infrastructure efficiencies, and in many cases deferring the need for major upgrades. Infrastructure upgrades can vary in cost, but typically range between $50,000 and $2,000,000 depending on the size and scope of the improvement. The present disclosure also provides for a reduction in the operational cost of sensor management and data gathering.

In yet another benefit of the present disclosure, the sensors and software help improve infrastructure utilization and efficiency, increase reliability, and better protect against brown/black out power shortages. The present disclosure also improves monitoring and alarms that can serve as an early warning sign to help prevent a data center outage. According to an Emerson study in 2011, data centers worldwide suffered complete outages an average of 2.5× during the year and lasted an average of 134 minutes per outage. The downtime cost of a data center averages approximately $300,000 per hour resulting in $1,700,000 in downtime per data center per year.

In the present disclosure, the sensors and similar devices attach to the outside of server racks using magnets, bolts, clips, or plugs, or any other attachment techniques that would not interfere with the operation of the system and sensors, as known by those having ordinary skill in the art and depending on the device. Although other configurations are possible as long as the devices can be located properly to sense environmental and other data. The system software can be cloud hosted, virtualized, or run locally.

The system software controls the sensors and measures data from the sensors that are placed throughout the facility. The system software can also display detailed information or status of the environmental conditions inside the data center. Some of the environmental parameters to be measured include, but are not limited to, temperature, air pressure, humidity, and IT power. The system software provides a detailed view into the power density, cooling requirements, and cooling supply of the data center, among other information, including, but not limited to, Computational Fluid Dynamics (CFD) analysis indicating air flow and temperature gradient throughout the facility.

Standard and custom visualizations will be used to view the low level data, and high level analytics will be used to analyze the performance of the data center and recommend or allow the implementation of measures that increase the efficiency. Standard operating procedures, best practices, audit and compliance logs, and fault detection are built into the software, as described herein. Further, the software can allow for hypothetical analysis to test theoretical scenarios and circumstances. All of the actual measured values and calculated analytics determined by the system can be mapped to the geographic location of the sensors.

In the present disclosure, the hardware products, sensors and similar products, utilize magnets or other attachment devices to attach to the side of a server rack. The hardware products can even be used to replace existing power supply power cables, in some configurations. By utilizing multiple sensors and magnets that attach to shelves at various heights on the rack, the sensors can measure vital temperatures at multiple points on the rack, as opposed to a single temperature measurement. The sensors can also be used to measure relative humidity and ambient pressure which gives a full picture of the data center environment in general and at specific locations, which can be automatically mapped in the data center by the sensors. Power monitors can replace the existing server power supply cables, and the sensor configurations are completely customizable and flexible for a variety of data center configurations and for growth.

Other objects and advantages of the present invention will become apparent to one having ordinary skill in the art after reading the specification in light of the drawing figures, however, the spirit and scope of the present invention should not be limited to the description of the exemplary embodiments contained herein.

DETAILED DESCRIPTION OF THE PREFERRED EMBODIMENT

Figure 1A:
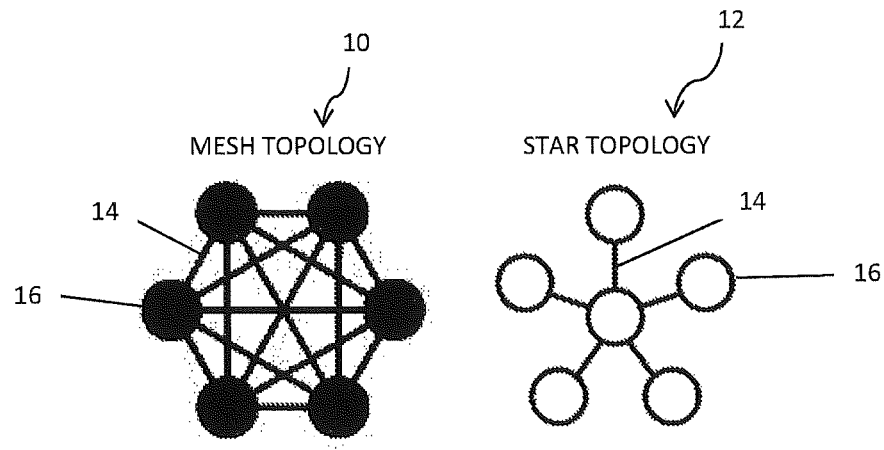
FIG. 1A illustrates a visualization of a mesh network topology versus a star network topology in accordance with the present invention.

The present disclosure pertains to systems and methods for obtaining environmental measurements (temperature, pressure, humidity, current, voltage, power, etc.) and associating them with sensor location or positional data and time data at a facility, such as a data center ("the environmental reporting system"). These devices are designed to operate as Internet of Things (JOT) devices that communicate over a customized low power mesh network. They are designed to solve two very complex problems simply: (1) environmental thermodynamic analysis and (2) sensor fleet management.

As described herein, the environmental reporting system provides for the sensing, analyzing and measuring of environmental parameters and conditions, which may include some or all of the following: temperature, air pressure, humidity, and power consumption, and others, at various locations and heights throughout the facility. By using the software associated with the system, the user can receive detailed views into the power density, cooling requirements, and cooling supply of the facility. The software can also be configured to provide standard and custom visualizations to view and understand either the low level data, or the high level analytics, so that the user is provided with analysis and an understanding of the performance of the facility.

To setup and install a sensor in the preferred embodiment is extremely easy. Turn it on, push a button, or use NFC to securely connect it to the network (no need to type in a Wi-Fi name or password), and use the magnets to attach it to a server rack (rack module). The sensor will begin to securely communicate encrypted traffic over the mesh network. Utilizing triangulation and trilateration technology, the sensors precisely, accurately, and automatically locate themselves in physical space and communicate their location data along with the environmental data.

This allows for the creation of a novel system and methods for measuring, analyzing and reporting environmental data that was previously unavailable at improved granularity. This allows for the generation of software to analyze locations of the sensors, collate the data, and create a 3D representation of the environment. Since the system collects time series data, as the space changes over time, the system gains valuable insights to the complicated thermodynamics and fluid dynamics in play. The ultimate result is better infrastructure management and greatly reduced energy costs.

The system is very robust and self-healing because of the energy scavenging hardware design and customized low power mesh network. The mesh network allows all the devices to use each other as relays to send data back to the server that collects it into the database, as opposed to a traditional star network topology that communicates back a single point, typically a Wi-Fi router. If a device fails, traffic can reroute back through the next nearest node automatically and is in effect, self-repairing.

An additional benefit to the mesh network protocol is that each additional device extends the range of the overall network by the net range radius of the additional device. This is similar to the idea of "daisy chains" in wired connections.

FIG. 1A shows the visualization of Mesh Topology 10 versus Star Network Topology 12. Each line 14 connecting the nodes 16 demonstrates a potential path that data could travel. The nodes 16 represent sensors.

Figure 1B:
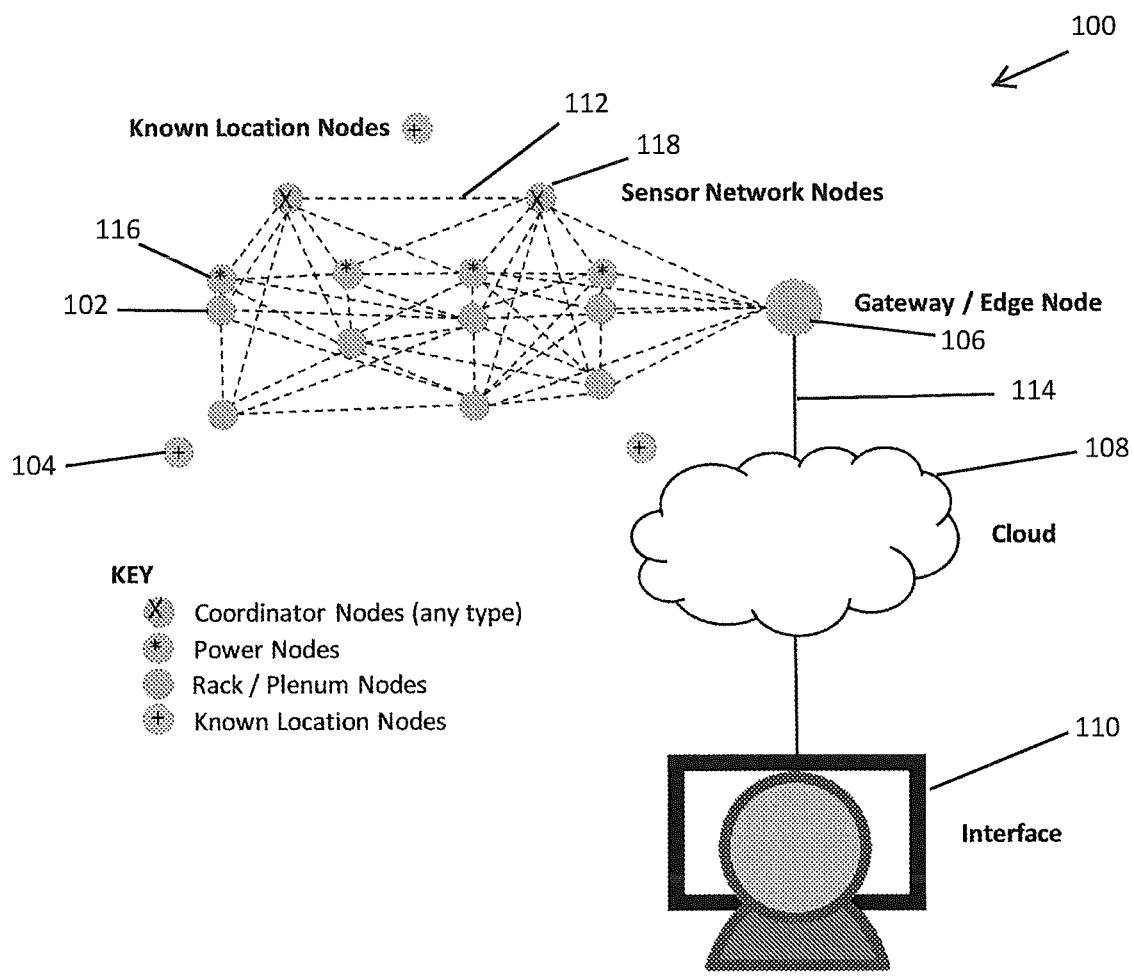
FIG. 1B illustrates a visualization of an operation topography map in accordance with the present invention.

FIG. 1B shows an operational topography map of the present invention in accordance with a preferred embodiment. The environmental reporting system 100 is a combination of five main components: the sensor network nodes 102, known location nodes 104, the gateway/edge nodes 106, the cloud 108, and the interface 110.

Figure 1C:
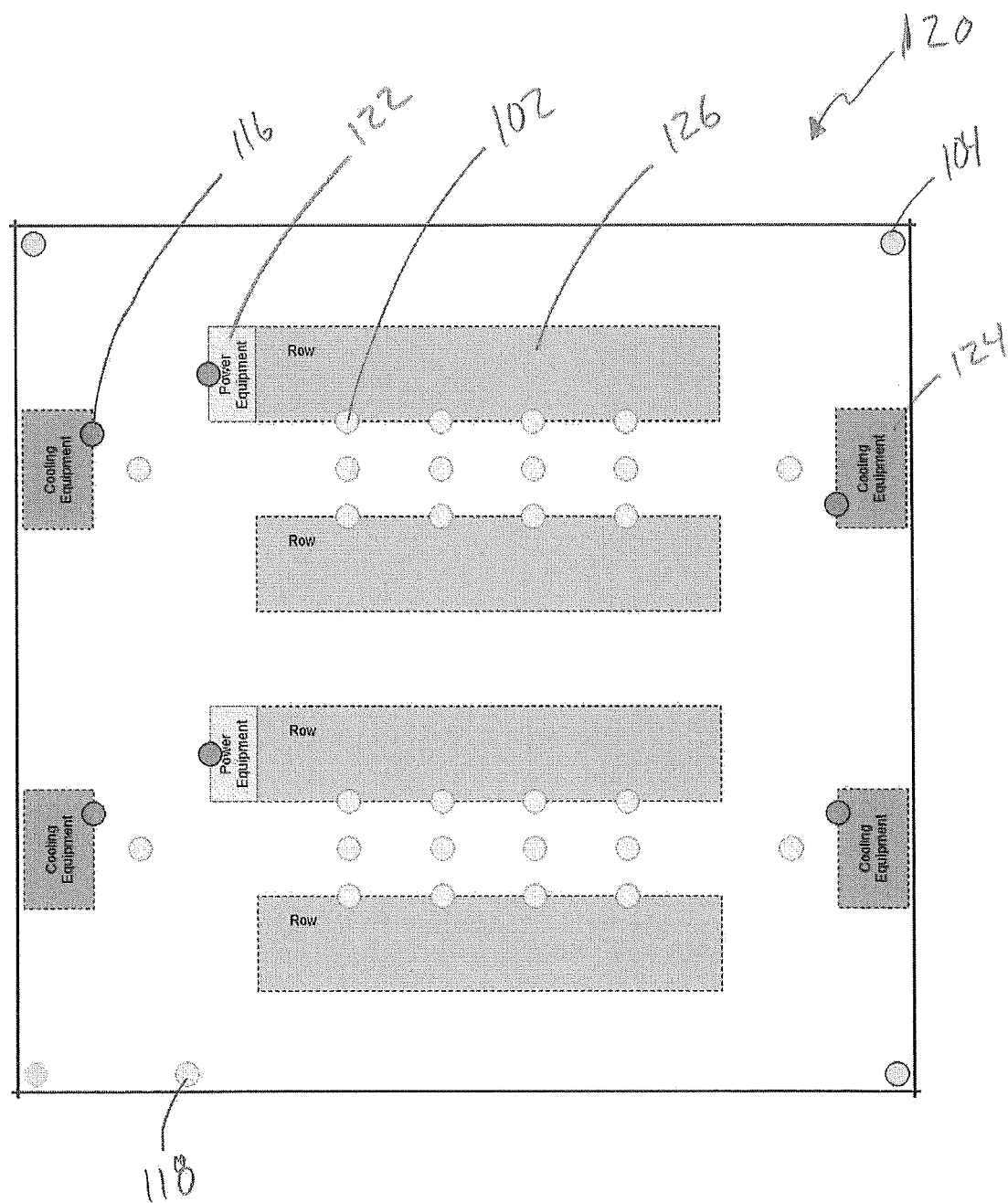
FIG. 1C illustrates a visualization of a data center/node overlay in accordance with the present invention.

The sensor network nodes 102 consists of three different node types, with the purpose to measure different aspects of the data center 120 (see FIG. 1C). These aspects include measurements about the environment at the rack level (rack nodes 68, FIG. 5), measurements about the environment in the floor, ceiling, or plenums (plenum nodes 70 FIG. 6), and power measurements (power nodes 72, FIGS. 7 and 8). The sensor network nodes 102 exist in the WPAN 112.

The known location nodes 104 are permanently installed in the data center 120 and are used to assist in increasing the accuracy of indoor positioning. The known location nodes 104 also exist in the WPAN 112.

The gateway/edge nodes 106 connect the sensor network nodes 102 to the cloud 108, and provide processing power for analytics and decision making that require low latency. The gateway/edge nodes 106 exist in both the WPAN 112 and WAN 114.

The cloud 108 stores all of the data, provides processing power for the core analytics, and hosts the interface 110. The cloud 108 is understood by one having ordinary skill in the art.

The interface 110 is for the client to view the data and analytics, make decisions, and control the network and environment in the facility. The interface 110 is also used for displaying reports and other output and is understood by one having ordinary skill in the art.

The environmental reporting system 100 utilizes a mesh network 112, such as a wireless personal area network or WPAN, along with a wide area network 114 or WAN to connect all of the components. In the preferred embodiment, the WPAN 112 is the network created by the sensor network nodes. The WPAN 112 will exceed industry standard encryption methods and will be implemented via AES 128-bit encryption. Keys will be stored in dedicated tamper proof hardware and encrypted via 256-bit elliptical curve encryption. The WAN 114 is used for the bridge to communicate with the cloud. HTTPS and VPN tunnels will be implemented for communication purposes.

Of course, other connection platforms can be used to provide connections between the nodes, as understood by one having ordinary skill in the art. Additionally, the preferred embodiment utilizes power nodes 116 and coordinator nodes 118, which may be nodes of any type described above.

FIG. 1C shows a data center overlay 120. The data center 120 contains power equipment 122, cooling equipment 124, and rows of racks or enclosures 126 for supporting data storage and servers, among other devices. The environmental reporting system 100 provides for the strategic placement of the various nodes described above, including the sensor network nodes 102, known location nodes 104, power nodes 116 and coordinator nodes 118, in the data center.

As an exemplary embodiment of the present disclosure, three separate hardware devices will be described: a rack node 68, a plenum node 70, and a power meter node 72. Each of the three sensor network node types and the know location nodes will consist of the same core but each has different sensor arrays to perform their specific functions.

The core 64 provides the ability to charge the internal battery from micro USB or energy harvesting mechanisms, monitor the battery, regulate power, read and write to the sensor array, wirelessly communicate with other modules, provide indoor positioning, accept user input, and provide user output. The sensor array 66 is made up of the sensors that are connected to each node type.

The following features of the core 64 and sensor array 66 functional block diagrams set forth in FIG. 2, and will be explained below, along with additional details for mesh network, sleeping mesh network, locationing and commissioning. The particular devices set forth herein are those used in connection with the preferred embodiment, and the claims are not intended to be limited to those particular devices, unless the device is actually recited.

Functional block [1] 20 is the external interface for charging a module from an external source. Charging 20 will be performed via a micro USB port 22 and will conform to the BC1.1 specification. All supporting integrated hardware will be selected to conform to this specification and to adequately support the power requirements of all of the functional blocks. Functional block [1] 20 will provide user output through functional block [7] 52.

Functional block [2] 24 is the onboard battery charging/energy harvesting/power source. Potential onboard power sources 24 include, but are not limited to, photovoltaic cells 26 and thermoelectric generators 28. The photovoltaic cells will use thin-film technology and the thermoelectric generators will use peltier elements. Both of the power sources will be selected and sized to adequately support the power requirements of all of the functional blocks. Photovoltaic cells 26 will be utilized when a light source is available and thermoelectric generators 28 will be utilized when a temperature differential is available. Functional block [2] 24 will provide user output through functional block [7] 52.

Functional block [3] 30 is the battery/power source. A rechargeable 18650 lithium ion battery 32 will be used. The Microchip 34 (MCP73831T) will be used for charge management. The Maxim MAX17043 will be used for charge status monitoring, or a fuel gauge 36. The battery will be sized to adequately support the power requirements of all of the functional blocks without power being supplied from functional block [1] 20 or functional block [2] 24 for a minimum of two years. Functional block [3] 30 will provide user output through functional block [7] 52.

Functional block [4a] 38 is for wireless communication 38. Wireless communication 38 will be accomplished via 6LoWPAN on the 802.15.4 protocol. The preferred wireless radio is the decaWave DW1000. The wireless communication/carrier frequency will support 1,000+ nodes with low sampling frequency and low data rate. Typical ranges that will have to be supported are 50 feet in a data center environment. All wireless communications will be encrypted with AES 128-bit encryption, and keys will be stored using 256 elliptical curve encryption. Hardware encryption will be done with the Atmel ATECC508A. Functional block [4] will provide user output through functional block [7] 52.

In an alternative embodiment, wireless communication 38 could be accomplished via low power Bluetooth. Bluetooth hardware could be selected to support the following protocols: Bluetooth 4.2 or newer, mesh networking (Bluetooth 4.2 or newer, CSRMesh, or custom developed), sleeping mesh networking (Bluetooth 4.2 or newer, CSRMesh, or custom developed), and beacons (iBeacon or uBeacon). NFC could be used to commission and configure a module via another NFC enabled device (smartphone). NFC hardware could also be selected to support ISO/IEC 14443 and ISO/IEC 18000-3. Functional block [4a] will provide user output through functional block [7] 52.

Functional block [4b] 38 also represents the indoor positioning. The indoor positioning will be accomplished with an ultra-wide band radio, which is the same or similar radio used for wireless communication in functional block [4a]. Indoor positioning will have an accuracy of <10 cm.

Functional block [5] 40 is data acquisition and orchestration. The hardware for the data acquisition and orchestration 40 will support analog and digital inputs, as well as the SPI, 12C USART and USB protocols, and general purpose processing to orchestrate the operations of the node. The preferred embodiment uses an ATMEL SAML21 microcontroller 42 for data acquisition and orchestration. Function block [5] 40 will be used to interface all of the other functional blocks.

Functional block [6] 44 is the user input. User input 44 will consist of a device on/off switch, button, touch pad, or other such technology 46, and a device commissioning switch 48, button, touch pad, or other such technology. The device commissioning input 48 will be used in place of or in tandem with the device commissioning from functional block [4] 38.

Functional block [7] 52 is the user output 52. User output 52 will consist of three RGB LEDs 54 (although more or less can be incorporated). In one configuration, the first RGB LED, power/on LED will indicate if the unit is on, off, or has low power. The second RGB LED, status LED, will indicate the status of the wireless communications, indoor positioning and commissioning. The third RGB LED, notification LED, will indicate if the module is measuring alert or exception conditions. Different LED color combinations can be used for different indications.

Functional block [8] 58 is the sensor array 66. The sensors in the sensor array 66 are broken into two classifications, environment sensors 60 and power sensors 62. The environment sensors 60 are temperature, humidity, pressure, occupancy, movement, and lighting level. The temperature sensors to be selected will be a contact RTD sensor and digital sensor. The humidity sensor to be selected will be a digital relative humidity sensor. The pressure sensor to be selected will be a digital barometric pressure sensor. Pressure differentials will be used to calculate air flows. The power sensors 62 are current and voltage. Voltage and current sensors 62 will be selected to measure RMS values.

Exemplary sensors include temperature sensors (Bosch BME280, Murata NXFT), humidity sensors (Bosch BME280), pressure sensors (Bosch BME 280), light sensors (thin film), occupancy sensors, inertial movement sensors (STI LSM9DS1), and current sensors.

Communication from the gateway/edge nodes 106 to the sensor network 102, 116, 118, and known location nodes 104 will be done over the WPAN 112. The gateway/edge nodes 106 will be able to communicate with the decaWave DW1000 radios in the sensor network nodes 102, 116, 118 and known location nodes 104. This can be done through a software defined radio (SDR) or through a USB interface (via the SAML21) to the decaWave radio.

Figure 3A:
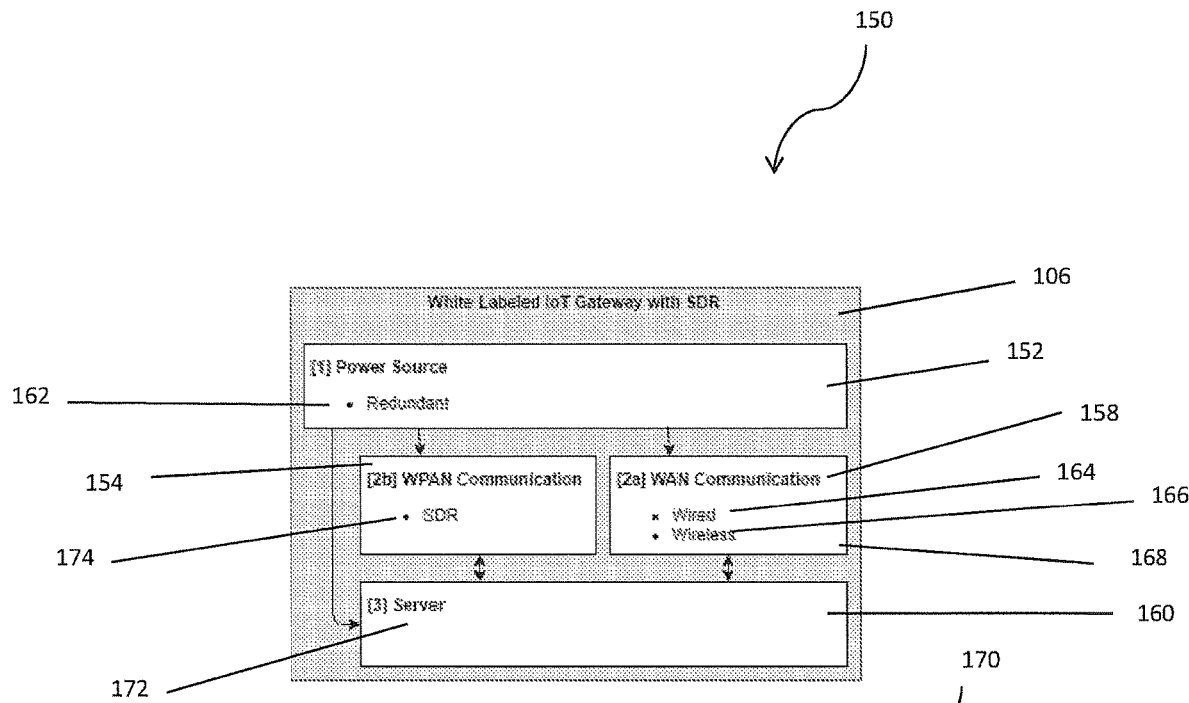
FIGS. 3A and 3B illustrate the gateway/edge system block diagram in accordance with the present invention.
Figure 3B:
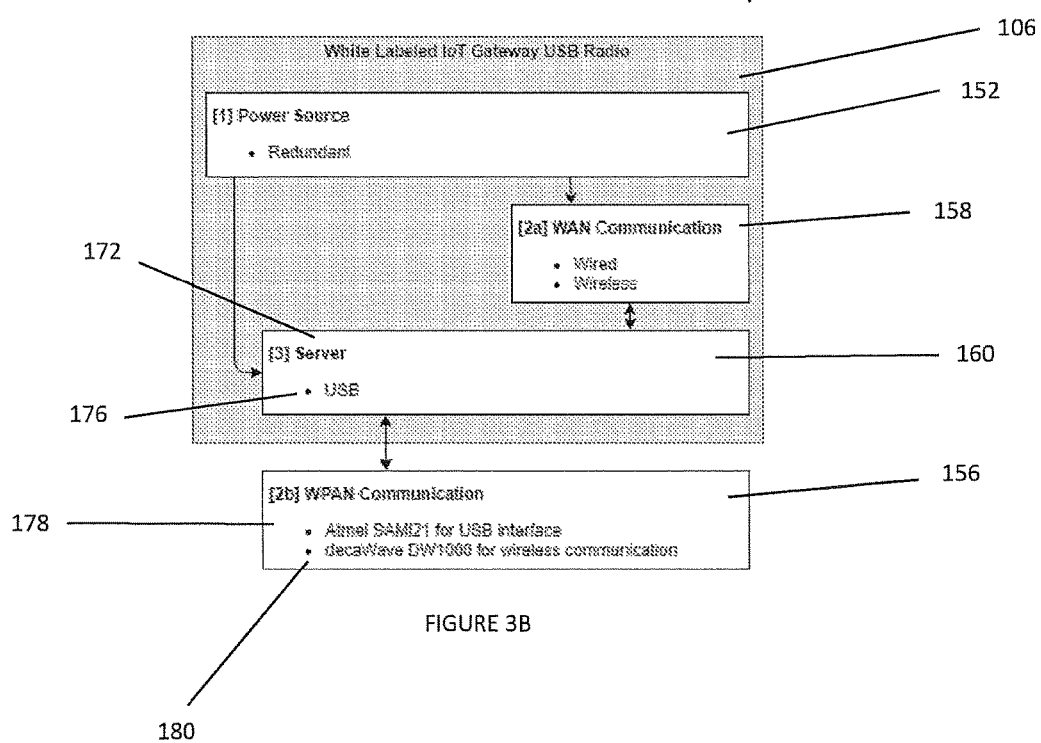

FIG. 3A shows the gateway/edge node functional block diagram 150 utilizing a SDR option for communication with the WPAN 112, and FIG. 3B shows the gateway/edge node functional block diagram 170 utilizing a USB interface option. Again, the particular devices set forth herein are those used in connection with the preferred embodiment, and the claims are not intended to be limited to those particular devices, unless the device is actually recited.

The gateway/edge node 106 can be selected from commercially available IoT gateways and configured or modified to work with the sensor network nodes 102, 116, 118, and known location nodes 104. The gateway/edge node 106 is made up of four functional blocks; the power source block 152, the WPAN communication block 154 (SDR option), the WPAN communication block 156 (USB interface option), the WAN communication block 158, and the server block 160.

The gateway/edge node 106 will be powered from redundant 120v single phase power supplies 162. Communication from the gateway/edge nodes 106 to the cloud 108 will be done over the WAN 114. This will be accomplished with a wired Ethernet connection 164, a Wi-Fi connection 166, or a cellular connection 168. All traffic will be routed through a VPN.

The server 160 will be a general purpose server 172 capable of running a host operating system (OS), preferably Linux. The OS will run the application code required to utilize functional block [2a] 158 and functional block [2b] 154, 156. In addition to this, application specific code will be located on the server 160.

In WPAN communication 154, using the SDR option 150, the gateway/edge nodes 106 will have an SDR 174 that will be configured to communicate with, for example, the decaWave DW1000. In the SDR option 150 no physical modifications to the white labeled IoT gateway will be required. It will however be necessary to configure the SDR 174.

In the WPAN communication 156, using the USS radio option 170, the gateway/edge 106 will have a USS port 176, which will be connected to a microcontroller 178, for example, the Atmel SAML21, which will act as a USB peripheral. The microcontroller 178 will be connected to a decaWave DW1000 180, as the decaWave DW1000 180 requires a host microcontroller to communicate over USB 176. In the USB radio option 170, physical modifications will be needed to facilitate communication of the gateway/edge router with the WPAN 112. These modifications utilize the same microcontroller as in the other nodes to provide a USB interface to the same radio used in the other nodes, which will allow for the same drives for the radio that are used in the other nodes. These physical modifications will reside either internal or external to the white labeled IoT gateway.

As described herein, modules communicate over a customized network that allows the devices to operate wirelessly, reliably, and for long periods of time with a low power consumption. This allows the module network to heal itself in the event that a module fails or loses power. The network is extremely robust and does not require a centralized point to communicate data. Modules will talk to the nearest device enabling a "daisy chain" of communication. This allows the network to operate with a range that grows with the communication radius of each device.

Potential protocols include, but are not limited to, 6LoW-PAN Bluetooth 4.2 or newer, CSRMesh, or a proprietary developed network that may utilize any of the aforementioned protocols. In the preferred embodiment, the gateway/edge nodes 106 will be selected from white labeled commercially available IoT gateways. The gateway/edge nodes 106 gather data from the sensor network, store a rolling window locally, and send the data to the cloud 108. The gateway/edge nodes 106 will also be responsible for analyzing the incoming data and performing any required low latency processes.

Additionally, sleeping mesh networks are a specific subset of mesh network that allow for reduced power consumption. In between communications, modules in a sleeping mesh network can further reduce their power consumption by shutting off their receive and transmit functions and relying on a precise internal clock to re-enable them for periods of communication.

Modules will automatically be located using triangulation and trilateration protocols from time of flight/time of arrive measurements and customized hardware controls that drive energy usage down to very low levels. This allows the module to tie sensor array measurements to a location and thusly create a detailed map of the modules and surroundings.

Commissioning will be defined as the automated process of adding a module to the network, configuring the module, and testing and verifying the communications and sensor array.

Figure 2:
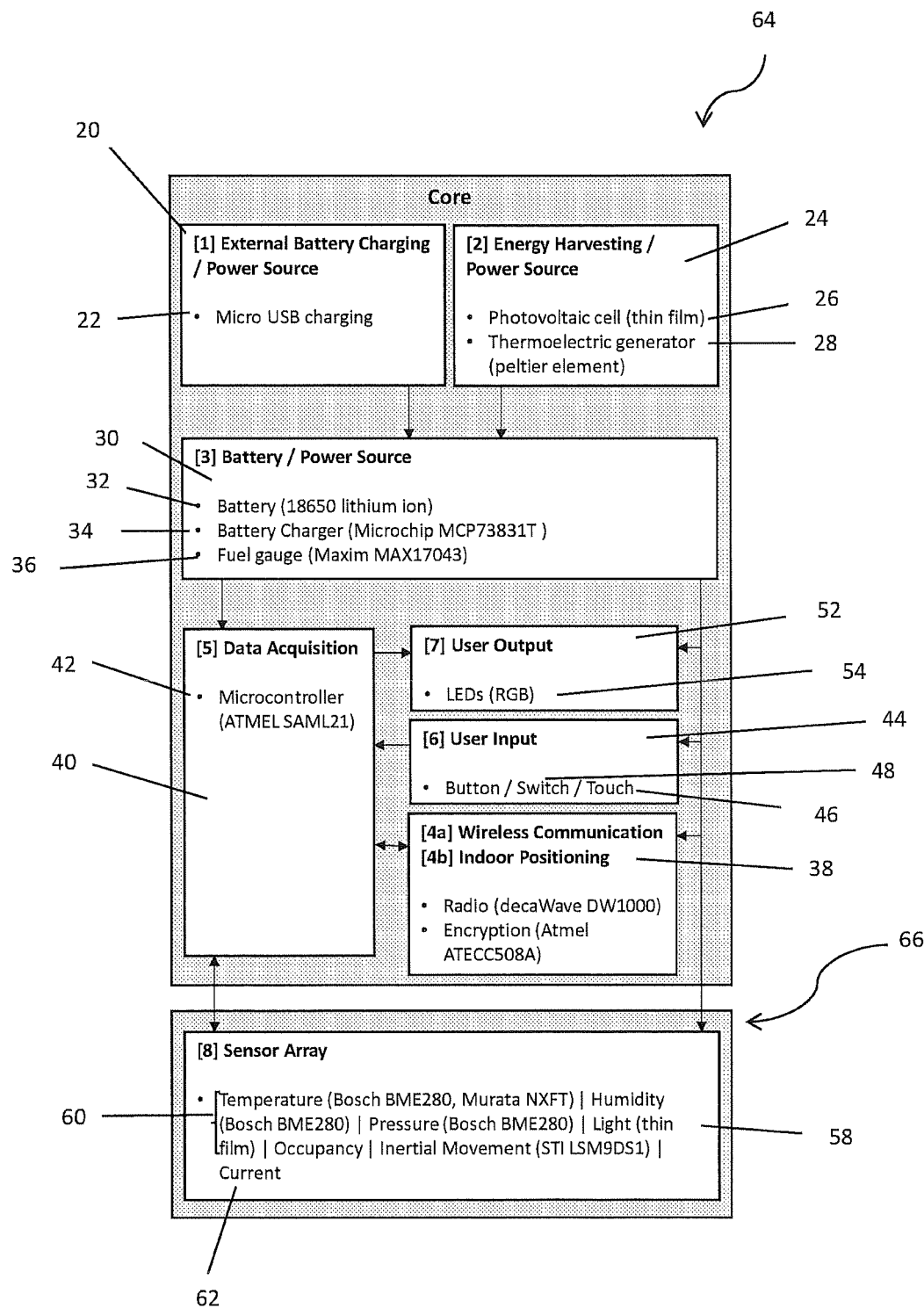
FIG. 2 illustrates the core and sensor array system block diagram in accordance with the present invention.

FIG. 2 shows additional detail of the core 64 and configurable sensor functional blocks 66 of each module 16 as described herein. Again, the core functional block 64 will be contained in each of the three types of modules 16, while the variable functional block 66 will be contained in each of the three types of modules 16 but functional block [8] 58 will only contain the sensors relevant to the modules function.

In the preferred embodiment, the rack nodes 102 will consist of the core and the follow sensor array: seven temperature sensors, a humidity sensor, a pressure sensor, a light sensor, an occupancy sensor, and an inertial movement sensor. The plenum nodes 102 will consist of the core and the follow sensor array: a temperature sensor, a humidity sensor, a pressure sensor, and an inertial movement sensor. The power nodes 116 will consist of the core and the following sensor array: a temperature sensor, a humidity sensor, a pressure sensor, a current sensor, and an inertial movement sensor. The known location nodes 104 will consist of the core and the following sensor array: a temperature sensor, a humidity sensor, a pressure sensor, and an inertial movement sensor. The gateway/edge nodes 106 will be selected from white labeled commercially available IoT gateways.

The hardware will be designed to be tamper proof. An attempted read of the firmware will cause the firmware to be erased. This will be deployed via a RTC tamper alert with a backup coin cell battery and the Atmel ATECC508A. All active core and sensor parts will have registered IDs. Any part without a registered ID will be rejected. This tamper resistance will be implemented via a blockchain structure.

Additionally, the core requirements are as follows: Operating Voltage: 3.3 V, Operating Temperature: −20° C. to 65° C., Operating Humidity: 0% RH to 100% RH, Operating Pressure: 300 hPa to 1100 hPa, Power Consumption: 5 mA normal operation. The sensor array requirements are as follows: Operating Voltage: 3.3 V, Interface: Analog or digital (I2C, SPI, or USART), Operating Temperature: −20° C. to 65° C., Operating Humidity: 0% RH to 100% RH, Operating Pressure: 300 hPa to 1100 hPa, Power Consumption: <0.5 mA normal operation.

The passive support components requirement is as follows: Operating Temperature: −20° C. to 65° C., Operating Humidity: 0% RH to 100% RH, Operating Pressure: 300 hPa to 1100 hPa. The environmental conditions are as follows: Operating Temperature: −20° C. to 65° C., Operating Humidity: 0% RH to 100% RH, Operating Pressure: 300 hPa to 1100 hPa. The service requirements are as follows: Users will be able to replace/recharge the battery, replace the antenna and everything else will be performed via field service or RMAs.

Figure 4A:
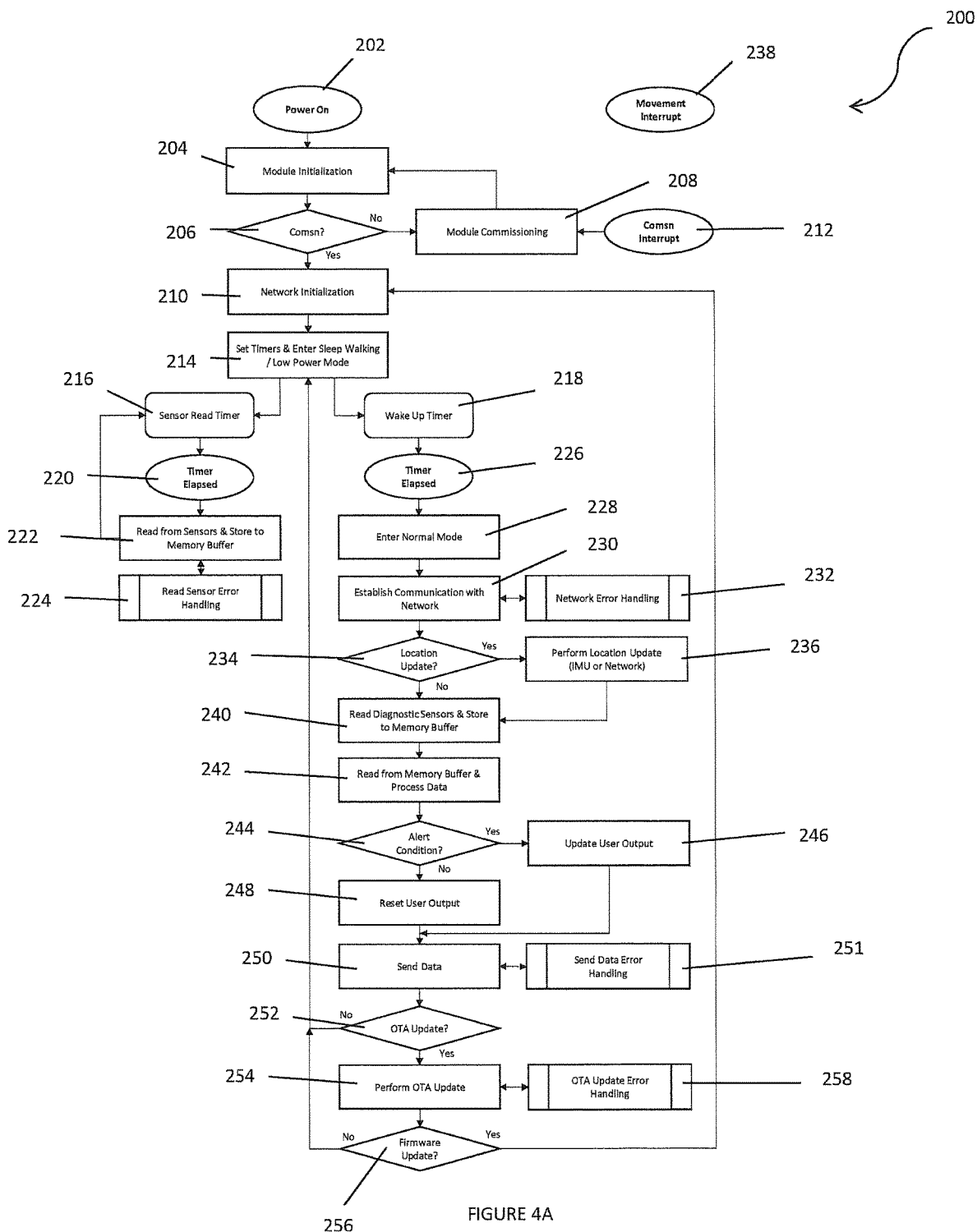
FIGS. 4A & 4B are flowcharts of the main state machine for the sensor network nodes, including interrupts in accordance with the present invention.
Figure 4B:
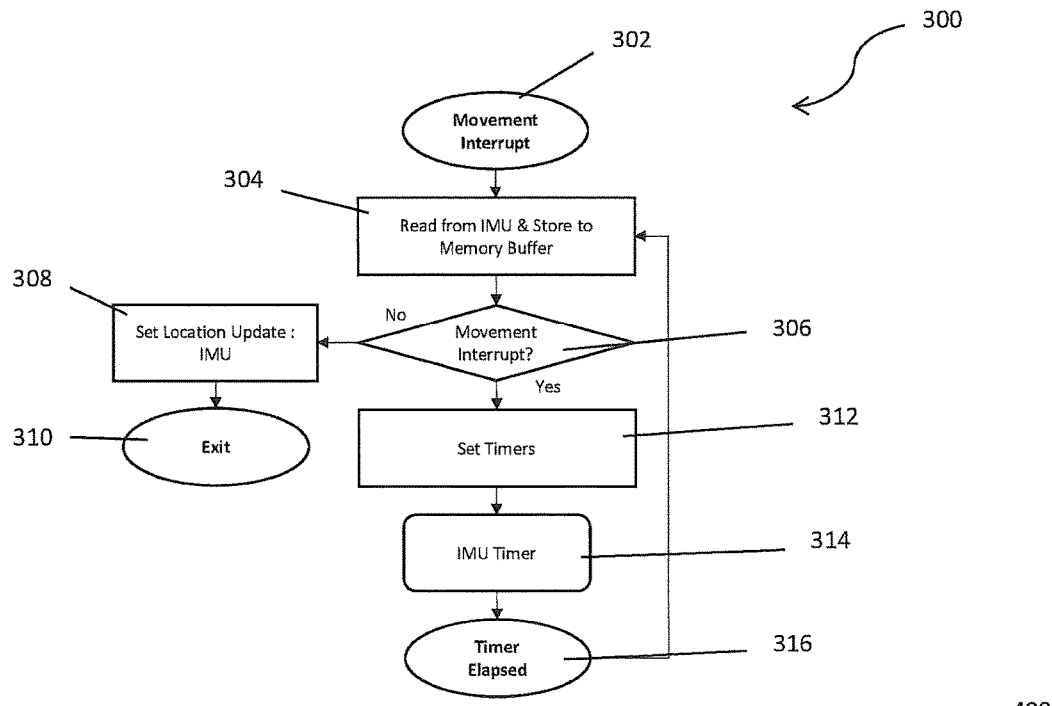
Figure 4C:
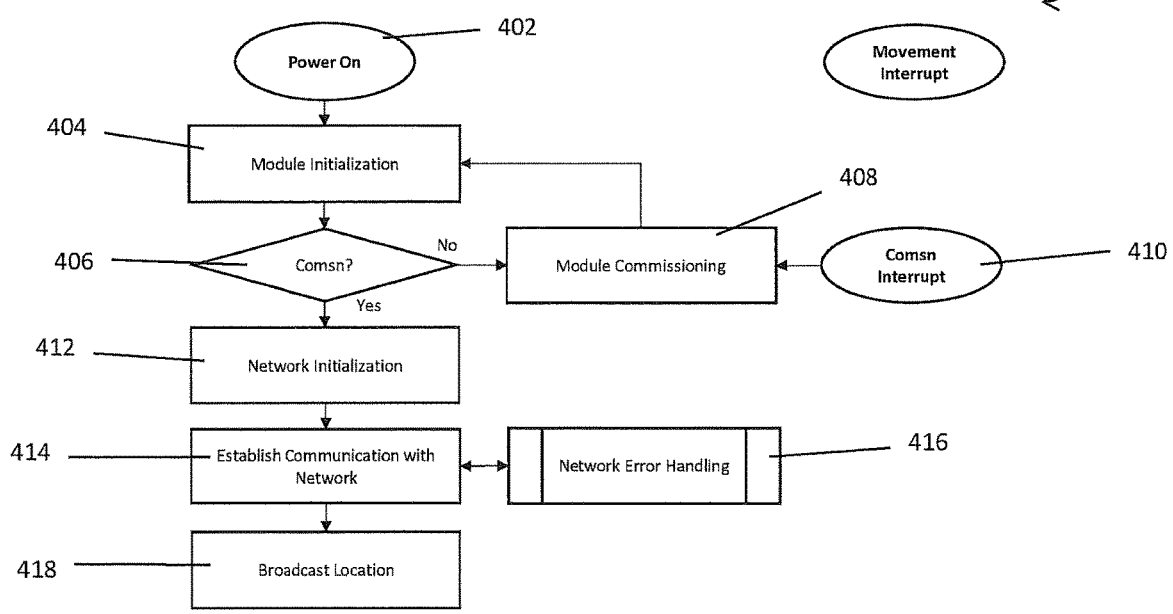
FIGS. 4C & 4D are flowcharts of the main state machine for the known location nodes, including interrupts in accordance with the present invention.
Figure 4D:
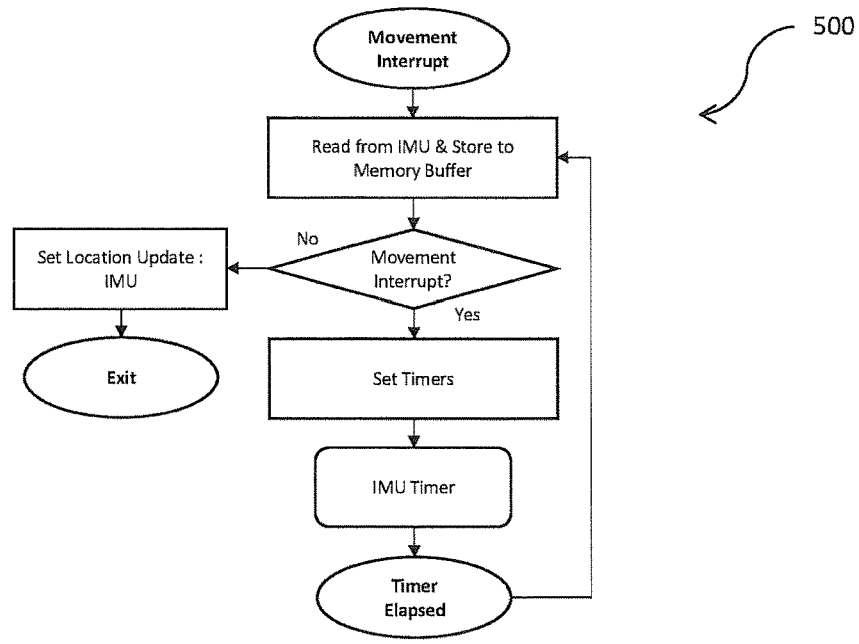
Figure 4E:
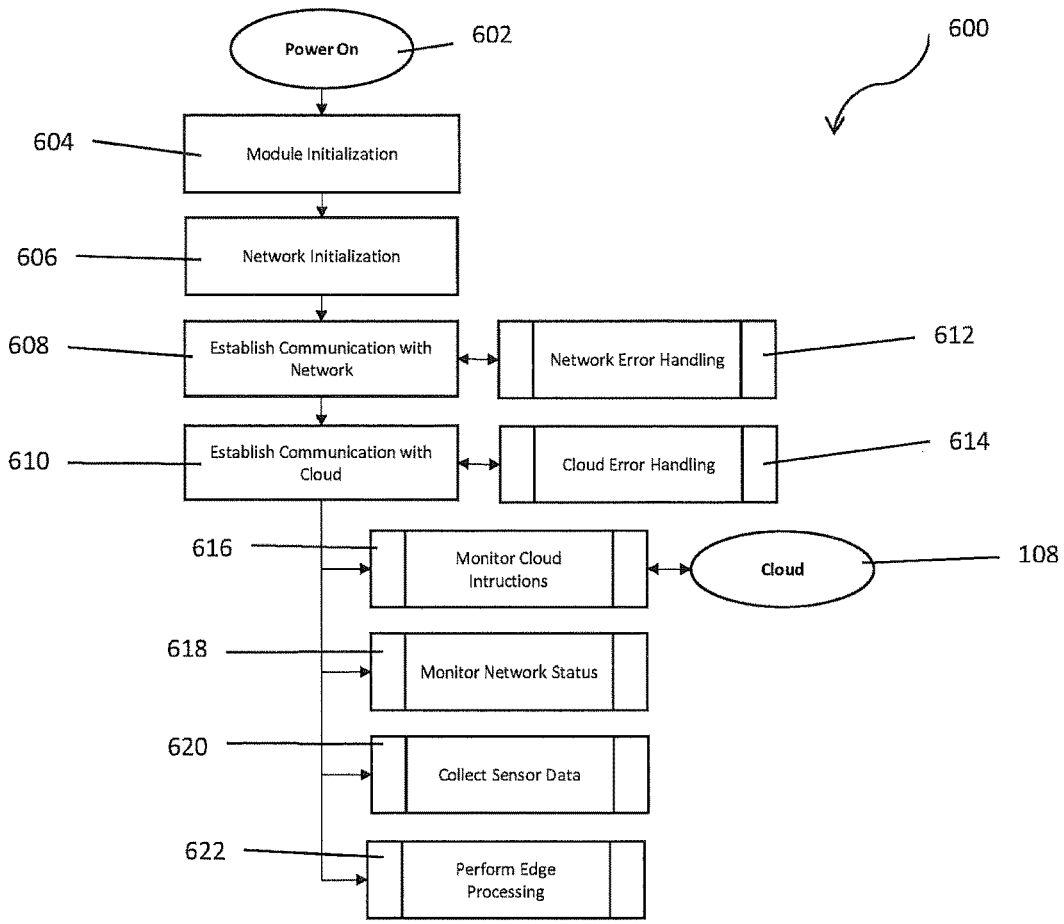
FIG. 4E is a flowchart of the gateway/edge application in accordance with the present invention.

The firmware requirements for the sensor network nodes are modeled in two sections: the main state machine including synchronous interrupts and the asynchronous interrupts. FIGS. 4A and 4B show flowcharts for the main system including asynchronous interrupts, while FIGS. 4C and 4D show flowcharts for the main system including the synchronous interrupts. FIG. 4E shows a flowchart for the gateway/edge nodes 106.

FIG. 4A shows a flowchart of the main state machine 200 of the environmental reporting system 100 in accordance with the present disclosure, including synchronous interrupts, for the sensor network nodes 102, 116, 118. Once powered on 202, the node 16 initializes itself 204 with the last known configuration. Upon completion, the node 16 will then check to see if it has been commissioned to the network 206. As described herein, commissioning is the process of registering, updating configuration, and adding a node 16 to the WPAN 112. If the node 16 has not been commissioned it will enter the commissioning sequence 208, then it will re-initialize itself with the new configuration parameters 210. Commissioning can also be manually initiated as indicated by the commissioning interrupt 212. This will be in the form of a user input that can happen at any time.

Otherwise the node 16 will set its wake up timers then enter a low power sleep mode 214. The sensor read timer 216 is used to sample the data from the sensors 16 and the wake up timer 218 is used to send the data sampled from the sensors to the gateway/edge node 106. The wake up timer 218 will be a multiple of the sensor read timer 216. This allows for more energy efficient operation.

Once the sensor read timer has elapsed 220, with nominal wake up, the node 16 will read from the sensors 60 in the sensor array 58 and store the values into a buffer 222. If there were any errors from reading the sensors 60, those will be handled as well 224. When these steps are complete, the node 16 will reset its sensor read timer 214 and return to a full sleep, starting the process over.

Once the wake up timer has elapsed 226 (which is a multiple of the sensor read timer of lower priority, indicating that when both timers elapse, the sensor read timer process will run first), the node 16 will completely wake itself up 228 and establish communication with the network 230. If there are errors in establishing communication with the network, those will be handled 232.

After this step, the node 16 will check if a location update is required 234. There are two forms of location updates 236, IMU and network. An IMU update will be triggered by the movement interrupt state machine 238, as described herein. If an IMU location update is to be performed, the node 16 will package all of the data from the IMU to be transmitted back to the gateway/edge node 106 later. If a network location update is to be performed, which will be a command issued over the WPAN 112 from the gateway/edge node 106, the node 16 will perform network ranging with its peers in the WPAN 112 and package the data to be transmitted back to the gateway/edge node 106 later.

The next step in the sequence, is for the node 16 to read or acquire from its diagnostic sensors 240 (network status from the wireless radio and battery status from the fuel gauge and battery charger) and package the data acquired. The node 16 will then read, process, and package the data stored from the sensor read timer routine 242. Based off the configuration on the node 16, the node 16 will then look at the packaged data to see if an alert condition has been determined 244.

An example of an alert condition could be a temperature value that is too high or a low battery. If there is an alert condition, the user output will be updated 246; otherwise the user output will be reset 248. Once these steps have been performed, the node 16 will transmit all of the packaged data 250 over the WPAN 112 to the gateway/edge node 106, and any errors will be resolved 251.

Finally, the node 16 will check for an over the air or OTA update 252. This will be issued from the gateway/edge node 106. If the OTA update was only for a new configuration, the node 16 will perform the update 254, reset its timers, and go back to sleep 214, starting the process over again. If the OTA was a firmware update 256, the node will perform the firmware update and reset itself back to network initialization 210. If there were any errors, those will be resolved 258.

FIG. 4B shows a flowchart of the asynchronous interrupts 300 of the main state machine 200 of the environmental reporting system 100, for the sensor network nodes 102, 116, 118, in accordance with the present disclosure. The asynchronous interrupts 300 will be generated if the IMU detects movement 302. This will be a hardware interrupt that is supported by both the IMU and microcontroller 40.

Upon the interrupt firing, the node 16 will read the data from the IMU and store it to a buffer 304. Then node 16 will check to see if the interrupt is still valid 306, if the node 16 is still being moved. If the interrupt is no longer valid, the node 16 will set an IMU location update 308 that will be handled by the main state machine 200, as described above, and exit 310.

If the interrupt is still valid, the node will set a timer 312 that will be used to trigger the next read of the data from the IMU 314, when the timer elapses 316, thus starting the process over again. All of this will be done while the node 16 is still sleeping.

FIG. 4C shows a flowchart of the main state machine 200 of the environmental reporting system 100, including synchronous interrupts 400 for the known location nodes 104, in accordance with the present disclosure. Once powered on 402, the node 16 initializes itself with the last known configuration 404. Upon completing that step, the node 16 will check to see if it has been commissioned to the network 406.

Commissioning, as described herein, is the process of registering, updating configuration, and adding a node 16 to the WPAN 112. If the node 16 has not been commissioned, it will enter the commissioning sequence 408, and then re-initialize itself with the new configuration parameters 404. Commissioning can also be manually initiated as indicated by the commissioning interrupt 410. This will be in the form of a user input that can happen at any time.

Otherwise the network will be initialized 412, and the node 16 will establish communication with the network 414. If there are errors in establishing communication with the network, those will be resolved 416. After communications with the network have been established 414, the node 16 will broadcast its location 418 to assist in network location updates. As described herein and shown in FIG. 4A, the main state machine 200, will check 252 and perform OTA updates 254, which will be handled as they are for the sensor network nodes.

FIG. 4D shows a flowchart of the asynchronous interrupts 500 of the main state machine 200 of the environmental reporting system 100, in accordance with the present disclosure. The asynchronous interrupts 400 of the main state machine 200 for the known location nodes 104 is the same as that described above and shown in FIG. 4B for the sensor network nodes 102, 116, 118.

FIG. 4E shows a flowchart of the gateway/edge node application 600 of the environmental reporting system 100, in accordance with the present disclosure. The gateway/edge node application 600 will run on the OS installed on the gateway/edge node 106. At power on 602, the application 600 will automatically start and will initialize itself 604 with the last know configuration. Once that step is performed, the application 600 will initialize the network 606 for the WAN 114 and WPAN 112.

Next, the application 600 will establish communication with WPAN 608, and establish communication with WAN 610, and resolve any errors with establishing communication with WPAN 612, and resolve any errors with establishing communication with WAN 614, appropriately.

Next, the application 600 will run four continual sub-processes; monitor cloud instructions 616, monitor network status 618, collect sensor data 620 and perform edge processing 622.

The monitoring cloud instructions 616 sub-process will maintain communication with the cloud 108 to listen for instructions. These instructions could include, but are not limited to, pushing OTA updates, updating configurations, requests for data, and updating status.

The monitoring network status 618 sub-process will continually monitor the status of the WPAN 112.

The collect sensor data 620 sub-process will continually orchestrate the process of gathering the data from the WPAN 114.

The perform edge processing 622 sub-process will perform any necessary processing on the data from the WPAN 112 that is not done on the other nodes 16 or the cloud 108. This sub-process will be utilized to lower latency and decrease power usage. Examples of edge processing are performing data center equipment control decisions, communicating with data center equipment, and assisting with real time calculations.

Figure 5:
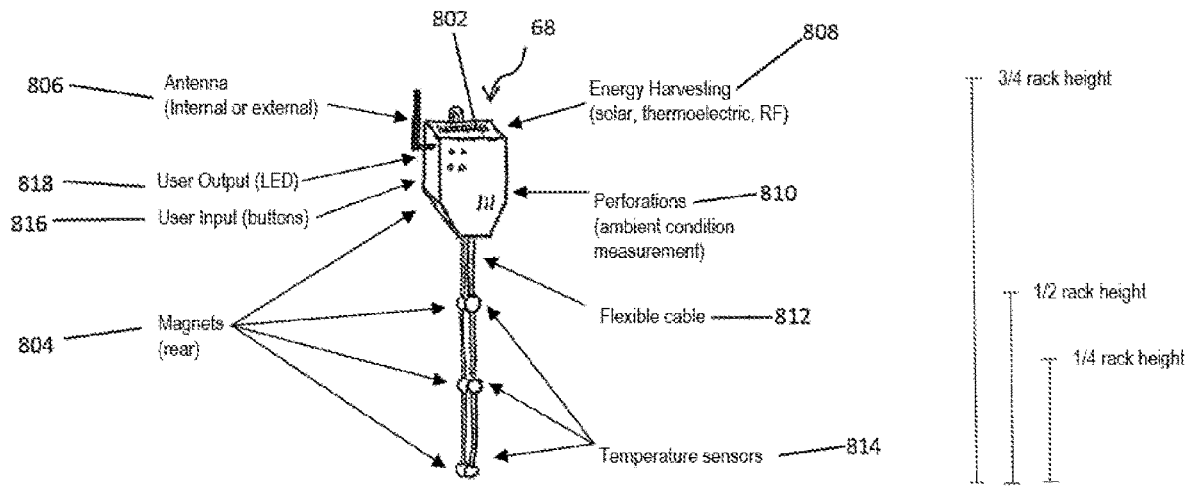
FIG. 5 illustrates a rack node in accordance with the present invention.
Figure 11:
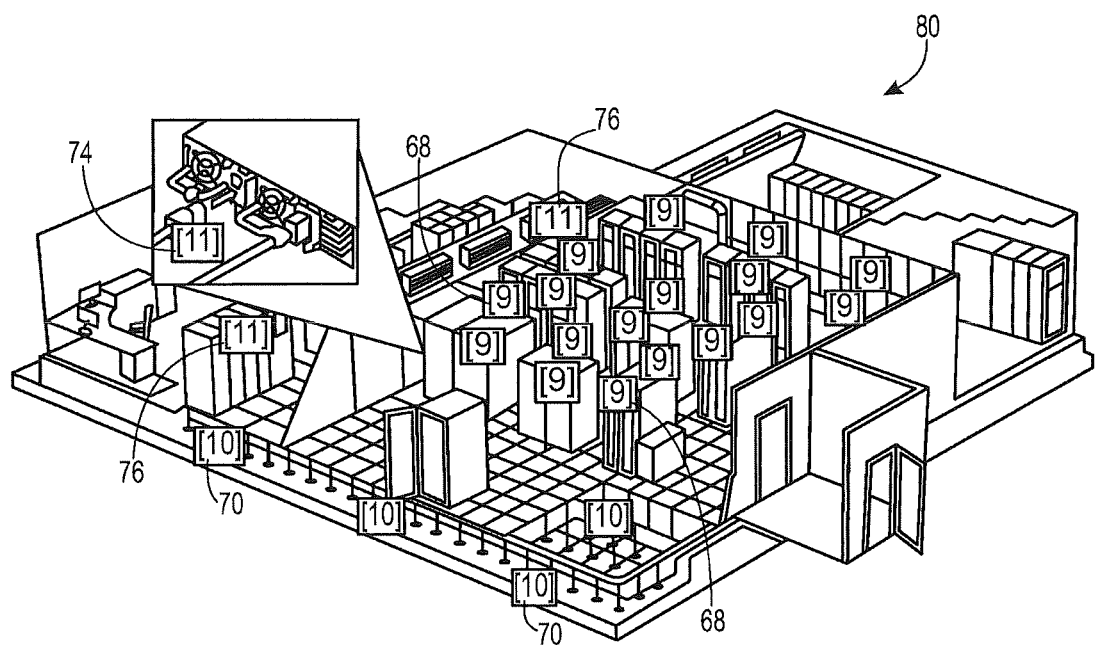
FIG. 11 illustrates a data center in accordance with the present invention.

FIG. 5 shows a rack module or node 68. The rack module 68 measures the environmental conditions of data center at various spatial locations and heights. This will be accomplished by attaching the rack modules to the top front and rear of the server racks at different locations across the data center (FIG. 11).

The rack modules 68, are made up of a housing 802, and will be attached to the rack with magnets 804, although other attachment methods can be used. The rack modules 68 also contain an antenna 806, which can be internal or external, and energy harvesting functionality 808, as described herein. The housing 802 contains perforations 810 for ambient condition measurements, and a flexible cable 812. Temperature sensors 814 are used to determine the temperature, and each rack module 68 contains inputs 816 such as buttons, and outputs 818, such as LEDs.

In the preferred embodiment, each rack module 68 will be capable of measuring temperatures at three different heights (¼, ½ and ¾ of the rack height), humidity at a single height, barometric pressure at a single height, and identifying its location.

The sensor network nodes 68 must be able to withstand a standard drop tests from 12 feet, withstand 400 lbs of pressure, with >2,000 on/off cycles. The nodes 68 will be made out of molded plastic, rubber cable sheathings and magnets, with a smooth texture. The color will be orange grey and black, and they will need to have mounts for the main PCB, the user input/output PCB, the antenna, the energy harvesting mechanisms, and the flexible cable. Holes or perforations will need to be made to attach the antenna, expose the user input/output, mount the flexible cable, and let ambient conditions into the unit. Magnets will have to be affixed to the module. The unit should be less than 3 inches long, 2 inches wide and 1 inch deep, except that the harvesting mechanism may extend past the stated dimension by 1 inch.

Figure 6:
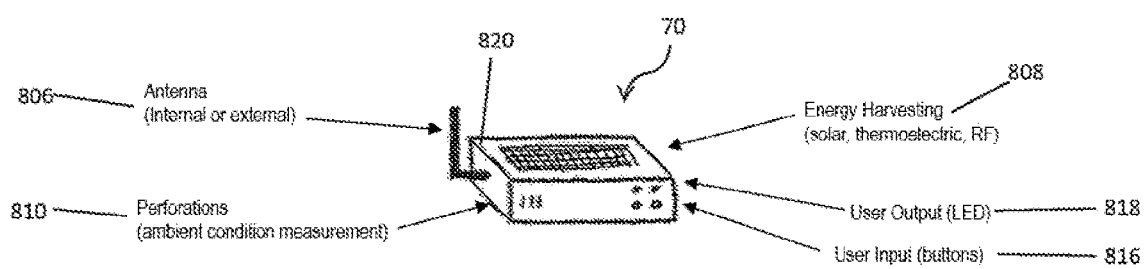
FIG. 6 illustrates a plenum node in accordance with the present invention.
Figure 9:
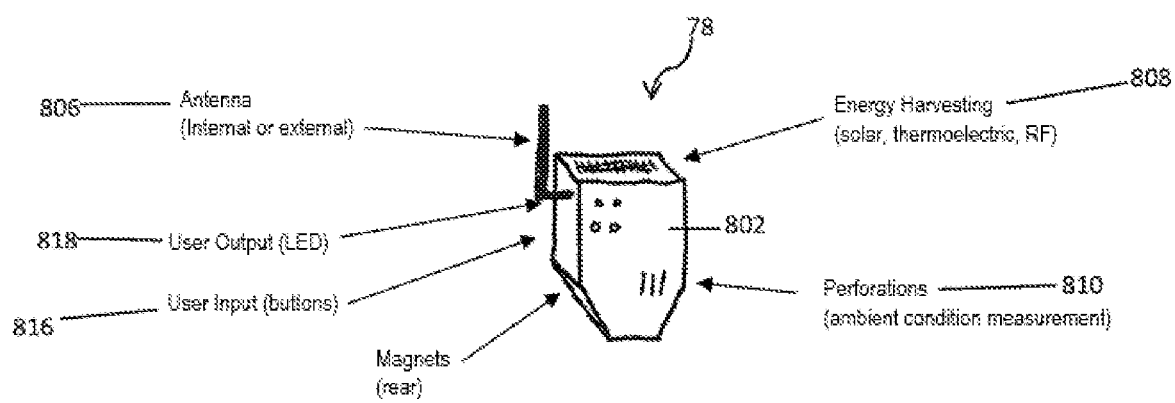
FIG. 9 illustrates a known location node in accordance with the present invention.

FIG. 6 shows the subfloor or plenum module 70, which measures, which records the environmental conditions of data center at various spatial locations of the subfloor, ceiling, or plenums. This will be accomplished by placing the subfloor or plenum modules 70 at different locations across the data center (FIG. 9). The plenum modules 70 contains a different housing 820 than the rack modules 68 (although it could be the same), and also contain an antenna 806, which can be internal or external, and energy harvesting functionality 808. The housing 820 contains perforations 810 for ambient condition measurements. Each plenum module 70 contains inputs 816 such as buttons, and outputs 818, such as LEDs.

In the preferred embodiment, each plenum or subfloor module 70 will be capable of measuring temperature, barometric pressure, and identifying its location.

Similarly, the plenum nodes 70 must be able to withstand a standard drop tests from 12 feet, withstand 400 lbs of pressure, with >2,000 on/off cycles. The plenum nodes 70 will be made out of molded plastic, rubber cable sheathings and magnets, with a smooth texture. The color will be orange grey and black, and they will need to have mounts for the main PCB, the user input/output PCB, the antenna, the energy harvesting mechanisms, and the flexible cable. Holes or perforations will need to be made to attach the antenna, expose the user input/output, mount the flexible cable, and let ambient conditions into the unit. Magnets will have to be affixed to the module. The unit should be less than 3 inches long, 3 inches wide and 1 inch deep, except that the harvesting mechanism may extend past the stated dimension by 1 inch.

Figure 7:
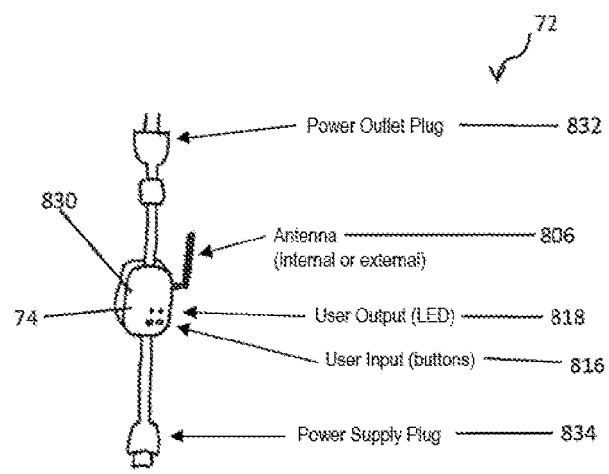
FIG. 7 illustrates an inline power node in accordance with the present invention.
Figure 8:
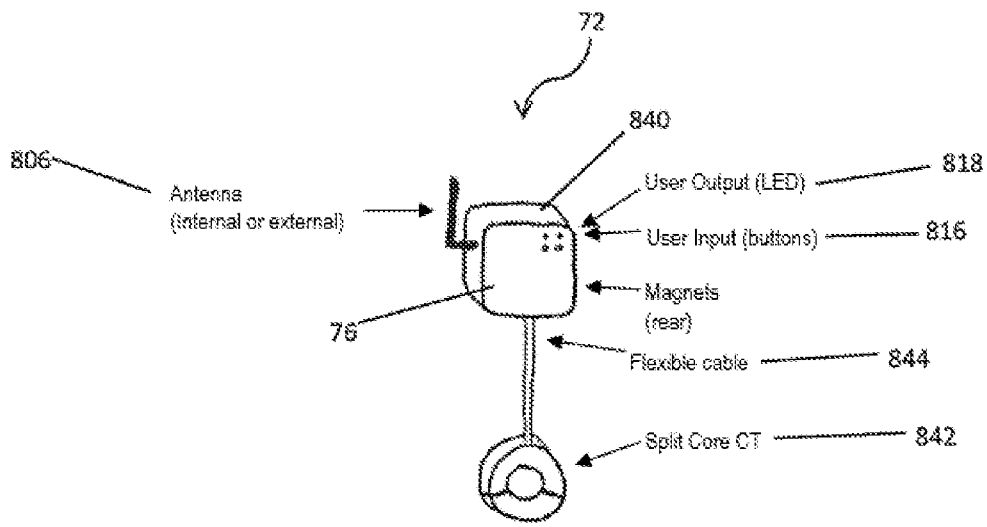
FIG. 8 illustrates a clamp on power node in accordance with the present invention.

FIGS. 7 and 8 show the power meter modules or nodes 72, which measures the power demand and consumption of equipment. There are two designs for the power meter module 72, an inline design 74 (FIG. 7) and a clamp on design 76 (FIG. 8).

The inline module 74 will replace each server's standard power cord with an inline power meter module 74. The inline module 74 will also have a housing 830, and a power outlet plug 832. An antenna 806, user input 816 and output 818, along with a power supply plug 834. Each inline power module 74 will be capable of measuring server current, server voltage, and identifying its location.

The clamp on module 76 will attach to any power supply cable in the data center between 120 and 480 volts. The clamp on module 76 will also have a housing 840, but no power outlet plug 832 or power supply plug 834. Instead, the clamp on module 76 will use a split core CT 842 and a flexible cable 844 to attach to the device, along with an antenna 806, and user input 816 and output 818. Each clamp on power module 76 will be capable of measuring server current and identifying its location.

Similar to the units described above, the in-line power node 74 will be made out of molded plastic, rubber 120 V cable, power output plug, power supply plug, with a smooth texture. The color will be orange grey and black, and they will need to have mounts for the main PCB, the user input/output PCB, the antenna, the energy harvesting mechanisms, and the flexible cable. Holes or perforations will need to be made to attach the antenna, expose the user input/output, mount the flexible cable, and let ambient conditions into the unit. Needs to be in line with a server power supply cable. The unit should be less than 3 inches long, 2 inches wide and 1 inch deep, except that the harvesting mechanism may extend past the stated dimension by 1 inch.

While the clamp-on power node 76 will be made out of molded plastic, rubber 120 V cable, power output plug, power supply plug, with a smooth texture. The color will be orange grey and black, and they will need to have mounts for the main PCB, the user input/output PCB, the antenna, the energy harvesting mechanisms, and the flexible cable. Holes or perforations will need to be made to attach the antenna, expose the user input/output, mount the flexible cable, and let ambient conditions into the unit. A split core CT will have to be attached to the device. The unit should be less than 3 inches long, 2 inches wide and 1 inch deep, except that the harvesting mechanism may extend past the stated dimension by 1 inch.

FIG. 9 shows a known location node 78. The known location nodes 78 are made up of a housing 802, which contains perforations 810 for ambient condition measurements, and magnets 804 for mounting the device (although other attachment devices can be used). The known location node 78 also contains an antenna 806, which can be internal or external, and energy harvesting functionality 808, as described herein. Each rack module 68 contains inputs 816 such as buttons, and outputs 818, such as LEDs.

Figure 10:
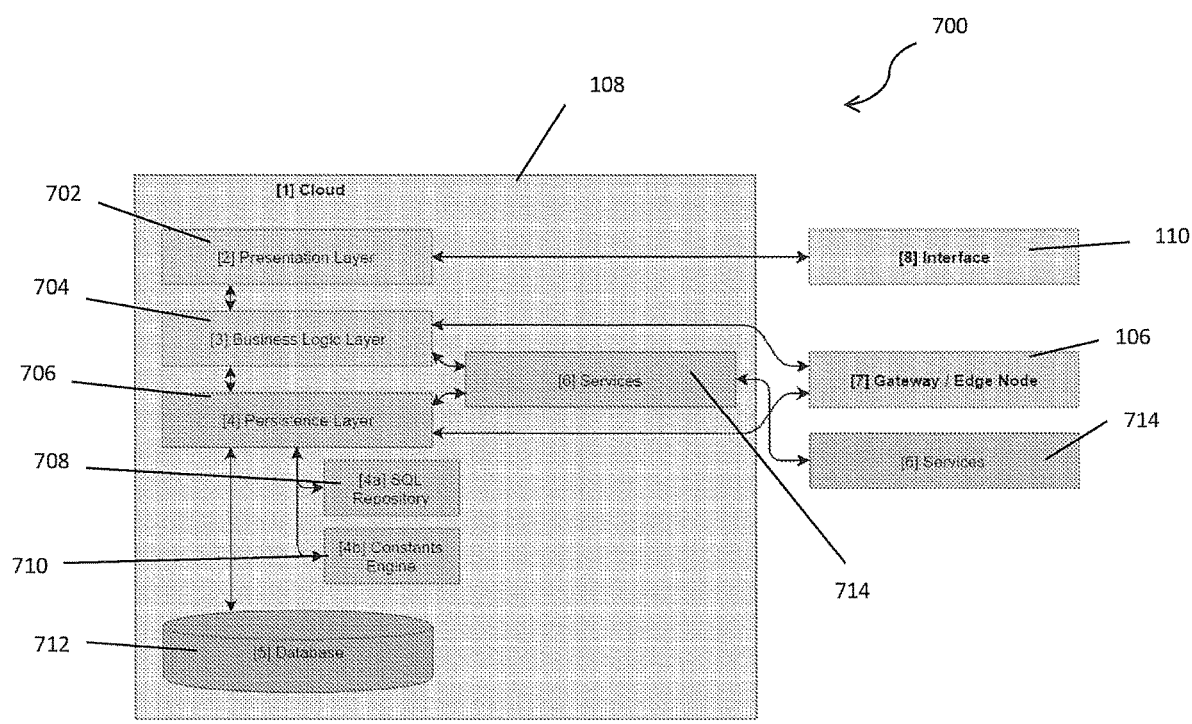
FIG. 10 illustrates the cloud and interface system block diagram in accordance with the present invention.

FIG. 10 shows an exemplary functional block diagram 700 for the cloud 108 and the interface 110. The cloud 108 hosts the applications data, executable code and provides security for the environmental reporting system 100. The cloud 108 can exist on a cloud providers' hardware (AWS, Google, Microsoft, etc.), as a virtual machine image to run on any hypervisor, or bare metal equipment, as understood by one having ordinary skill in the art. In general, the cloud 108 is made up of a number of layers, services, databases, engines and repositories, among other items. The layers include, but are not limited to, the presentation layer 702, the business logic layer 704, and the persistence layer 706, along with the SQL repository 708, the constants engine 710, the database 712 and various services 714. Outside of the cloud 108 is the interface 110, gateway/edge nodes 106 and services 714.

The presentation layer 702 is responsible for generating HTML and JavaScript code that is to be delivered to the interface 110 (modern web browser). In the preferred embodiment, the use of browser plugins will be avoided due to security issues. The core libraries, frameworks, and technologies that will be used in the presentation layer 702 are, for example, HTML5, CSS3, JavaScript, Node.js, React.js, WebPack, WebGL, three.js, and D3.js.

The business logic layer 704 holds all the formulas and proprietary technology. The business logic layer 704 is also responsible for communicating with the services 714, presentation layer 702, persistence layer 706, and in some cases the gateway/edge node 106. As an example, it may be more efficient to do some calculations on the collected data and then store it in the database 712. The business logic layer 704 can perform such calculations before the data is stored in the database 712. The business logic layer 704 is also responsible for mapping the data transfer objects from the persistence layer 706 to the presentation layer 702. This mapping avoids sending unnecessary information to the portal and keeps the html/JavaScript objects and payload small. The core libraries, frameworks, and technologies that will be used in the business logic layer 704 are Java, Jetty, Spring JDBC, Rest, and Maven.

The persistence layer 706 is responsible for converting language specific code to SQL. This layer 706 is also responsible for mapping one object to one or more tables in the database 712. The opposite is also true, this layer 706 is able to combine a few tables into one object for the client data (in this case the services 714 or business logic layer 704). Although some of the SQL code may be generated dynamically at run time, most of the SQL code is kept inside the SQL repository 708. This repository 708 can be used in future if the main programming language of portal is changed. The core libraries, frameworks, and technologies that will be used in the persistence layer 706 are Java, Jetty, Spring JDBC, Rest, and Maven.

The SQL repository 708 is a subset of the persistence layer 706 that contains SQL code for the services 714. Some SQL may need to be generated dynamically but the most common SQL scripts will be stored in the SQL repository 708. The SQL repository 708 will be able to handle multiple programming languages.

The constants engine 710 is a subset of the persistence layer 706 that contains constants used in static equations. Examples of constants include converting from temperature RTD values to degrees Fahrenheit, triangulation and trilateration constants, and unit conversions.

The database 712 will store all of the data generated from the sensor network nodes 102, 116, 118, known location nodes 104, gateway/edge nodes 106, interface 110, and user actions. In the preferred embodiment, the database 712 is PostgreSQL.

The services layer 714 is responsible for offering a series of REST services to a client. A client can be third party service, sensor, gateway, or the interface. Security is an important factor when building the services layer 714. This layer 714 should be very selective to deny any client that is not trusted. A certificate based security model will be used for this communication. This layer 714 will use the business logic layer 704 to store some information into the database 712. This layer 714 can also use the information in the database 712 to compute some information for the end client.

As described herein, the gateway/edge node 106 will feed data from the sensor network nodes 102, 116, 118 and known location nodes 104 to the database 712 and business logic layer 704. The data will be sent through a VPN IPsec tunnel to the cloud 108.

As described herein, the interface 110 provides the visual experience for the user. It will be delivered through a modern web browser that supports HTML5, CSS3, and WebGL. The interface will consist of a series of dashboards, data visualizations, analytics, and conversations.

Additionally, in the preferred embodiment, the technologies used for security directly on the cloud 108 are OpenLDAP, Apache Shiro, and 256 bit file system/container encryption. Communication between the cloud 108 and gateway/edge nodes 106 will be secured through a IPsec VPN tunnel. Communication between the cloud 108 and interface 110 will be secured via https. Authentication and authorization will be used to access the cloud 108 and interface 110, as well as the features and components of the features.

The cloud application is modeled in five sub-processes. The gateway/edge node data sub-process is responsible for connecting the gateway/edge node 106 and retrieving data. The gateway/edge node 106 will provide a REST service that the cloud application can use to accomplish this. Once the data has been retrieved, the business logic layer 704 and persistence layer 706 will be used to process and store the data in the database.

The gateway/edge node instructions sub-process is responsible for relaying and receiving instructions from the gateway/edge node 106 and any associated required data. These instructions could include, but are not limited to, pushing OTA updates, updating configurations, requests for data, and updating a status.

The interface host and requests sub-process is responsible for serving the interface 110 and processing and/or providing requests to the interface 110.

The service host and requests sub-process is responsible for serving the services 714 responding to requests.

The monitoring and logging sub-process monitoring the cloud 108, cloud application, interface 110, and user actions. The outputs are processed and stored in the database 712 and will be used to identify internal quality issues, identify how users use the interface 110, and provide quantitative data for AB testing.

The interface 110 is divided up into layout and features. The layout depicts the functional layout for the interface window and the widgets. The window is the main layout for the interface 110 and will be accessible through a web browser. There are two main layout features in the window, the feature container and the widget container.

The feature container displays the icons for the different features supported by the interface 110 and an ability to navigate through the different features. The widget container displays the different widgets for the selected feature and an ability to navigate through the different features. The widget layout describes the default minimum layout for any widget. This includes the widget content, a way to reposition the widget in the widget container, and a way to access the widget settings.

The features supported in the interface include dashboards; data center selection; data visualization; data center views; alerts, events and exceptions; trends; CFD modeling; auditing; planning; and workflow and conversations. Additionally, there are universal features, common to most systems, including data browser; export; content, insights, action; conversation; machine learning; and help, as understood by one having ordinary skill in the art.

Customizable dashboards can be created by using widgets from any of the features described herein. Default dashboards can be created to show the status of the data center, performance of the data center, suggested insights and actions to improve the performance, alerts, events, and exceptions. If multiple data centers are to be used in the interface 110, it will be possible to select between them, or combinations of them. This will be done by visually presenting the data centers on a geographic map and displaying a snapshot of the default dashboards for each data center.

Different combinations of data can be selected, including multiple data sets, to be visualized. Aggregation of data can be selected, including selecting multiple sets of data to be visualized as one set of data. As an example, a user or operator can select all temperatures to be combined in a statistical manor and then visualized. Transformations of data can be selected, such as applying an equation to a combination of data sets to be visualized. As an example, the user can add two power data sets to visualize the sum.

Many different charts and types of charts can be used to visualize the data. Examples include table, line, control, bar or pie chart. Also, the environmental reporting system 100 can plot out the data in histograms, scatter plots, violin plots or contour lines, among others. The environmental reporting system 100 can show a stratification, or a visualization showing the data set differentials at different heights inside of the data center. Also, custom data presentation views will utilize data visualization with prepackaged views. Examples of this are visuals presentations of temperature differentials, cooling unit utilizations, and supply and return temperatures.

The user can access different data sets. For example, the user can select the date range, use time and date values to select the date range, or use conditional statements to select the data range, to visualize the data. As an example the user can choose to only view the data sets when a single data set has a value over 80. Further, the user can select the frequency to plot the data visualization, which can be done by averaging the data, taking the minimum, taking the maximum, or representing all three.

The data view can be expanded when viewed. Data tick will be available to see exact values and timestamps. And, when aggregate data is being viewed, it will be possible to select the individual data set with in the aggregate. An example of this is selecting the maximum value or group of values in a violin plot.

Global controls can also be applied to a data visualization, such as normalization or even using a secondary axis to view data of different scales.

The data center view provides automated drawing and rendering of the data center in a three-dimensional view. This will use the location data from the nodes 16. Rules can be applied to fit the constraints of data when drawing and rendering. It will be possible to modify the automated drawing and rendering to correct any of the errors from automation. It will also be possible to navigate through the three-dimensional view, which can be done through panning, zooming, and rotating. All of these will be implemented in an intuitive way.

Current sensor reading values can be overlaid on the data center with the addition of sparklines. Filters can be used to select which type of node or sensor to display. Filters can also be used to select which areas to display. Current sensor reading conditional filters can be used to select which sensors to display. An example would be only displaying all temperature values over 80.

Alerts, event, and exceptions; auditing reports; CFO visualizations and planning scenarios can be overlaid on the data center.

Alerts are individual data points for groups of data points that violate a rule. Events are groups or patterns of alerts that are statistically similar. Exceptions are trends in data sets that can indicate the potential triggering of an alert or event. The environmental reporting system 100 will provide the ability to view alerts, exceptions, and events, and managed each of them. Alerts, events, and exceptions can also be overlaid on the data center view and data visualization features.

The trends feature can be used to identify trends in a single data set or amongst multiple data sets. Methods that will be employed are multivariate regression, pattern recognition, and machine learning, among others. Regression and statistical modeling will be used to discover relationships in the data and data center operations. Models with these relationships will be used to benchmark and track various parameters. PUE and power analysis and forecasting will be used to show how power is being distributed and utilized in the data center.

A CFO modeling feature will provide the ability to model the air flow and temperature gradients. The output of the CFO modeling will indicate how the air moves through the data center along with the temperature gradients as the air moves. This will be shown in an animation that will be overlaid onto the data center view. It will be possible to perform "what if" analysis by reconfiguring the equipment in the data center. The output of this what if analysis will be another CFO animation and estimated performance of the data center.

An auditing feature will provide historical audit logs for SLA compliance (to manage the SLA's for the data center and report against them), data center performance (historical data center performance reports will be available and annotatable), data center occupancy logs (occupancy sensors on the nodes will be used to measure occupancy at the highest level possible). The user can also correlate occupancy with alerts, events, and exceptions. This will be available in a report. Additionally, interface usage logs will keep track of user access of the interface, features, and feature components, as that access will be logged and presented in a report.

Capacity planning will be available utilizing the CFO modeling. This will be an extension of the what if analysis that involves adding new equipment to the data center. Also, workflow and conversations will provide the ability to create tasks for the data center and manage them in a custom workflow. Computer generated task can be generated as well. Conversations can also be held around the tasks and workflow.

As for the data browser, when selecting data to be view, the selection will be presented in a location based view. This will manifest itself in the form of a slimmed down version of the data center view, and will make it possible to select the correct data to view without having to look up a nodes identifier based on its location.

Additionally, all data and reports will have the ability to be exported as a PDF, CFO, or raw data base dump, and any content that the interface is displaying will have corresponding insights and actions as applicable. The insights functionality can be used to identify, report and forecast a number of different environmental and other issues. For example, hot and cold spot identification, temperature condition reporting, air flow condition reporting, humidity condition reporting, alarming and alarm forecasting, fault detection and fault forecasting, opportunity and efficiency identification, efficiency and savings reporting and forecasting, and 3D representation of the sensors in space, among others.

Specific examples include line plots for a temperature sensor that has an alert condition, an automated analysis of the alert condition examining the cause of the alert, and a recommended action to correct the alert. Many other examples exist.

All data and features will have the ability to comment on them. Comments will be tied the data and visible with the data or in the workflow and conversations feature. Comments may also be automatically generated through the machine learning feature.

The interface will further utilize machine learning to identify changes it should make to itself or the network. The changes will be presented to the user for approval. For example, the sampling frequency of a node is too low to adequately perform a what if analysis; and the user is presented with the situation and a recommend change to the sampling frequency. The user can then approve or deny this change. The machine learning algorithm will also be able to surface relevant features and data sets contextually how the user uses them.

Every feature will have the ability to provide help to the user or operator. The help feature provided will be contextual based off of what the user is doing. It will also be possible for the interface to contact personnel, provide them with the context, and allow them to assist the user.

FIG. 11 shows an exemplary spatial layout of the three different modules in a data center 80, additional modules, such as the known location module 104 and the gateway/edge node 106 are not shown for simplicity reasons. The rack modules [9] 68 are shown in the middle area of the data center 80, the plenum or subfloor modules [10] 70 are shown near the front of FIG. 11, and the power modules [11] 72 are shown to the left of the data center 80 shown in FIG. 11. These locations are merely for reference and are not indicative, nor required, of a typical data center 80.

The rack modules 68 are spaced throughout the data center 80 to get an accurate representation of the data center 80 environmental conditions above the subfloor or plenum. Rack module 68 typical spacing could be on the front and back of every three racks or every group of racks. The plenum or subfloor modules 70 are spaced throughout the subfloor or plenum of the data center 80 to get an accurate representation of the environmental conditions of the subfloor or plenum. Ideally the plenum or subfloor modules 70 would be underneath the perforated tiles closest to the rack modules 68. The inline power modules 74 are to be installed on the primary power supply of every server. Additional installations of the clamp on power modules 76 are shown on a power distribution rail and a computer room cooling unit.

As described in detail herein, the software that works with these devices manages the network that the devices communicate on, collects the data, and analyzes the data to create information and insights about the data center environment and data center power consumption. The software will perform certain functions, as detailed herein. Additionally, there will be software configuration.

Figure 12:
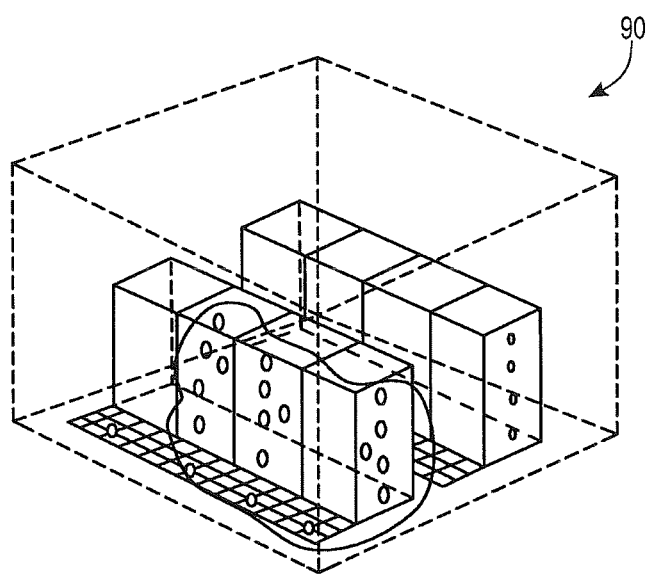
FIG. 12 illustrates a top level three-dimensional visualization report in accordance with the present invention.

FIG. 12 shows top level 3 dimensional (3D) visualization of the data center 80 in accordance with the present invention. The 3D representation 90 of the sensors in space makes intelligent assumptions of what the space contains, depending on the application (for example, if in data center: server rack, perf tiles, power distribution units, etc.) to help automate a richer 3D model, as opposed to sensors floating in space.

Figure 13:
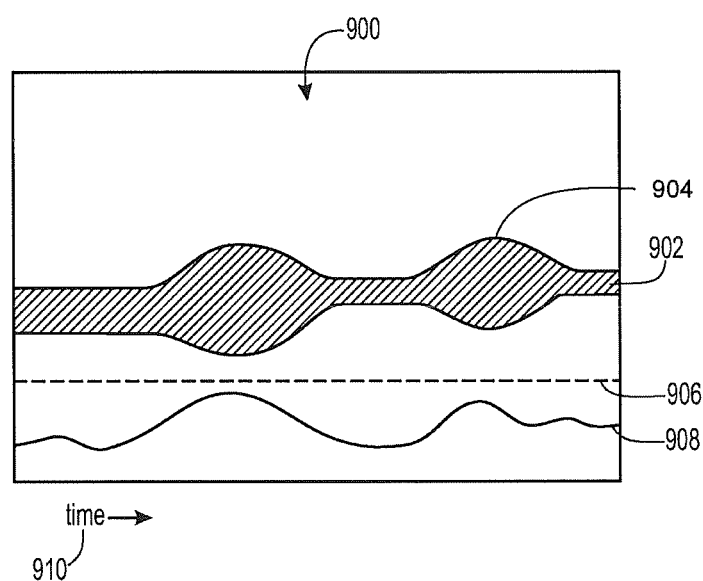
FIG. 13 illustrates a group view report in accordance with the present invention.

FIG. 13 shows a group view 900 indicating temperature 902 (can use red and blue colors), pressure 904 (width of chart), humidity 906 (dotted line) and power 908 (solid line). All of these measurements are reported over time 910. Of course, there are many ways to represent these and other environment and power conditions.

Also supported is Augmented Reality (AR) representations of the installed sensors. This will enable the user to walk around and see analysis real-time overlaid on top of real physical objects while wearing an AR device (for example, Microsoft Hololense, Magic Leap, or any other AR devices). In such a data center scenario, a user wearing an AR device could see where every sensor was located as they looked around, relevant metrics related to the sensors (temperature, pressure, humidity, voltage, current, etc.) and could view real-time analysis of the environment, such as heat flow and air flow representations, etc.

Further, the system could provide AR What If Analysis. AR capabilities allow the user to perform and experience simulations in the same physical real-world space that the sensors occupy. For example, the user could look at the space, virtually change the pressures at different points, and look inside the space to see how temperatures and pressures change as a result of the proposed pressure changes.

While the disclosure is susceptible to various modifications and alternative forms, specific exemplary embodiments thereof have been shown by way of example in the drawings and have herein been described in detail. It should be understood, however, that there is no intent to limit the disclosure to the particular exemplary embodiments disclosed, but on the contrary, the intention is to cover all modifications, equivalents, and alternatives falling within the scope of the disclosure as defined by the claims upon issuance.

What is claimed is:

1. A method comprising:
    determining a location of a sensor node in a facility by communicating with at least one known location node;
    setting a sleep timer of the sensor node to a first value;
    putting the sensor node into a low power sleep state until an expiration of the sleep timer;
    detecting movement of the sensor node while the sensor node is in the low power sleep state;
    in response to detecting movement of the sensor node, generating an interrupt;
    in response to the interrupt, indicating a location update is necessary;
    waking the sensor node and checking whether the location update is necessary at the expiration of the sleep timer;
    in response to determining the location update is necessary, determining a new location of the sensor node; and
    communicating the new location and an environmental parameter measured by the sensor node to a remote server.

2. The method of claim 1, further comprising:
    setting a sensor measurement timer to a second value, the first value being a multiple of the second value; and
    measuring the environmental parameter via the sensor node at an end of the sensor measurement timer.

3. The method of claim 1, wherein communication functions of the sensor node are disabled when the sensor node is in the low power sleep state.

4. The method of claim 1, wherein the sensor node comprises a power node configured to measure a power condition of electrical power supplied to electronic equipment within the facility, wherein the power condition comprises a current and the power node comprises a split core current transformer configured to clamp onto a power cord connected to the electronic equipment, or the power condition comprises a current or voltage and the power node comprises a power supply plug and a power outlet plug.

5. The method of claim 1, wherein the sensor node comprises a temperature sensor, a humidity sensor, or a pressure sensor, and the environmental parameter comprises a temperature, air pressure, or humidity, the method further comprising:
    associating the environmental parameter with the first location or the new location, via the remote server; and
    generating a status report of the environmental parameter in the facility based on the environmental parameter and the location or new location,
    the status report comprising one or more graphs, three dimensional maps, charts, windows, dashboards, histograms, or scatter plots to display the environmental parameter, and
    the status report reporting power density, cooling requirements, cooling supply, or computational fluid dynamics analysis indicating air flow and temperature gradient throughout the facility.

6. The method of claim 1, wherein the method further comprises:
    in response to the interrupt, determining whether the interrupt is still valid, wherein the interrupt is still valid if movement is still occurring;
    in response to determining the interrupt is still valid, waiting until an end of a time limit before again determining whether the interrupt is still valid; and
    in response to determining the interrupt is not still valid, indicating the location update is necessary.

7. The method of claim 1, wherein determining the location or the new location of the power node comprises communicating with the at least one known location node using one or more ultra wide band radio signals.

8. A system comprising:
    a remote server; a known location node; and a sensor node comprising:
        a wireless communication module configured to communicate with the known location node and the remote server;
        a sensor that measures an environmental parameter; and
        a processor configured to:
            determine a location of the sensor node based on one or more ultra-wide band radio signals received, via the wireless communication module, from the known location node,
            set a sleep timer of the sensor node to a first value,
            put the sensor node into a low power sleep state until an expiration of the sleep timer,
            detect movement of the sensor node while the sensor node is in the low power sleep state,
            in response to detecting movement of the sensor node, generate an interrupt,
            in response to the interrupt, indicate a location update is necessary,
            wake the sensor node and check whether the location update is necessary at the expiration of the sleep timer,
            in response to determining the location update is necessary, determine a new location of the sensor node, and
            communicate the location and the environmental parameter to the remote server.

9. The system of claim 8, wherein the processor is further configured to:
    in response to the interrupt, determine whether the interrupt is still valid, wherein the interrupt is still valid if movement is still occurring,
    in response to determining the interrupt is still valid, wait until an end of a time limit before again determining whether the interrupt is still valid,
    in response to determining the interrupt is not still valid, indicate the location update is necessary.

10. The system of claim 8, wherein the wireless communication module is disabled when the sensor node is in the low power sleep state.

11. The system of claim 8, wherein the sensor node comprises a power node configured to measure a power condition of electrical power supplied to electronic equipment within a facility, wherein the power condition comprises a current and the power node comprises a split core current transformer configured to clamp onto a power cord connected to the electronic equipment, or the power condition comprises a current or voltage and the power node comprises a power supply plug and a power outlet plug.

12. The system of claim 8, wherein the sensor comprises a temperature sensor, a humidity sensor, or a pressure sensor, the environmental parameter comprises a temperature, air pressure, or humidity, and the remote server is configured to
  associate the environmental parameter with the location or the new location, and
  generate a status report of the environmental parameter in the facility based on the environmental parameter and the location or new location,
  the status report comprising one or more graphs, three dimensional maps, charts, windows, dashboards, histograms, or scatter plots, and the status report reporting power density, cooling requirements, cooling supply, or computational fluid dynamics analysis indicating air flow and temperature gradient throughout the facility.

13. The system of claim 8, wherein the processor is further configured to:
  set a sensor measurement timer to a second value, the first value being a multiple of the second value, and
  measure the environmental parameter via the sensor at an end of the sensor measurement timer.

14. The system of claim 8, wherein the sensor node further comprises an inertial movement sensor (IMU), and the processor is configured to detect movement of the sensor node via the IMU.

15. The system of claim 8, wherein the sensor node further comprises an energy harvester configured to serve as a power supply of the sensor node or charge the power supply of the sensor node.

16. The system of claim 15, wherein the energy harvester comprises a photovoltaic cell or a thermoelectric generator.

17. The system of claim 8, wherein the interrupt is an asynchronous interrupt.

\* \* \* \* \*